(12) United States Patent
Suzuki

(10) Patent No.: US 8,982,229 B2
(45) Date of Patent: Mar. 17, 2015

(54) STORAGE MEDIUM RECORDING INFORMATION PROCESSING PROGRAM FOR FACE RECOGNITION PROCESS

(75) Inventor: Toshiaki Suzuki, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 331 days.

(21) Appl. No.: 13/176,181

(22) Filed: Jul. 5, 2011

(65) Prior Publication Data

US 2012/0081568 A1   Apr. 5, 2012

(30) Foreign Application Priority Data

Sep. 30, 2010  (JP) .............................. 2010-222032

(51) Int. Cl.
| | | |
|---|---|---|
| *H04N 5/235* | (2006.01) | |
| *H04N 5/228* | (2006.01) | |
| *H04N 5/225* | (2006.01) | |
| *H04N 13/02* | (2006.01) | |
| *G06T 19/20* | (2011.01) | |

(52) U.S. Cl.
CPC ............ *H04N 13/0275* (2013.01); *G06T 19/20* (2013.01); *G06T 2219/2004* (2013.01)
USPC ............... 348/222.1; 348/208.15; 348/207.99

(58) Field of Classification Search
USPC .................. 348/222.1, 208.15, 207.1, 207.99
See application file for complete search history.

(56) References Cited

U.S. PATENT DOCUMENTS

| | | | | |
|---|---|---|---|---|
| 2005/0057657 | A1* | 3/2005 | Yamada et al. | 348/207.99 |
| 2005/0088538 | A1* | 4/2005 | Nozaki et al. | 348/229.1 |
| 2007/0116364 | A1* | 5/2007 | Kleihorst et al. | 382/190 |
| 2008/0239104 | A1* | 10/2008 | Koh | 348/240.99 |
| 2010/0188426 | A1* | 7/2010 | Ohmori et al. | 345/660 |

FOREIGN PATENT DOCUMENTS

| | | |
|---|---|---|
| JP | 2002-288686 | 10/2002 |
| JP | 2002-351603 A | 12/2002 |
| JP | 2003-289468 A | 10/2003 |
| JP | 2004-230480 A | 8/2004 |
| JP | 2006-331009 A | 12/2006 |
| JP | 2010-68222 A | 3/2010 |
| JP | 2010-199883 A | 9/2010 |

* cited by examiner

*Primary Examiner* — Joel Fosselman
(74) *Attorney, Agent, or Firm* — Nixon & Vanderhye P.C.

(57) ABSTRACT

An information processing device, which acquires a face image of a person to be imaged that is captured by an imaging device, executes: a determination step of determining whether a distance between a face of the person to be imaged and the imaging device is within a predetermined range; and a display step of, if the distance between the face of the person to be imaged and the imaging device is determined to be within the predetermined range in the determination step, displaying, on a display device, a target position for alignment of at least one feature point contained in the face image of the person to be imaged, together with the face image of the person to be imaged repeatedly captured by the imaging device.

19 Claims, 19 Drawing Sheets

STORAGE MEDIUM RECORDING INFORMATION PROCESSING PROGRAM FOR FACE RECOGNITION PROCESS

CROSS-REFERENCE TO RELATED APPLICATIONS

This application is based upon and claims the benefit of priority of the prior Japanese Patent Application No. JP2010-222032, filed on Sep. 30, 2010, the entire contents of which are incorporated herein by reference.

TECHNICAL FIELD

The present technology relates to an information processing program and an information processing device, for instance an information processing program and an information processing device that acquire an image of an imaging target by way of imaging means.

BACKGROUND

Creation of three-dimensional shape models onto which face images are pasted is a known technology (for instance, Japanese Patent Application Publication No. 2002-288686). In a three-dimensional shape model onto which, for instance, a face image is pasted, the shape of the mouth in structured data is deformed in accordance with the output of voice data. In order to impart a natural appearance upon pasting of a two-dimensional face image onto a three-dimensional shape model, feature points of the eyes, mouth and the like in the two-dimensional face image are aligned with feature points of eyes and mouth of the three-dimensional shape model.

In cases where the shape of the eyes and the mouth of the three-dimensional shape model undergoes deformation, as in Japanese Patent Application Publication No. 2002-288686, unnatural motion may occur at parts where the shapes of the eyes mouth and so forth deform if positions are offset from each other even slightly during alignment. Therefore, face images that are to be pasted onto a three-dimensional shape model that involves deformation of eye and mouth shapes should preferably be imaged so as to match the three-dimensional shape model.

During imaging of a face image of a person, for pasting on a three-dimensional shape model, for instance the distance between the camera and the face and/or the orientation of the face in the left, right, up and down directions is adjusted in order to bring the face of the person to a position that is appropriate for the face image. Imaging processing of face images for three-dimensional shape models is complex as a result.

SUMMARY

An aspect of the present technology aims at providing an information processing program, an information processing device, an information processing system and an information processing method that afford enhanced accuracy in the arrangement of an imaging target with respect to a target position of in a captured image.

One aspect of the present technology is a storage medium recording an information processing program that is executed in an information processing device that acquires a face image of a person to be imaged that is captured by an imaging device. The information processing program causes the information processing device to execute: a determination step of determining whether a distance between a face of the person to be imaged and the imaging device is within a predetermined range; and a display step of, if the distance between the face of the person to be imaged and the imaging device is determined to be within the predetermined range, displaying, on a display device, a target position for alignment of at least one feature point contained in the face image of the person to be imaged, together with the face image of the person to be imaged repeatedly captured by the imaging device.

In one aspect of the present technology there is determined whether a distance between a face of a person to be imaged and the imaging device is within a predetermined range; such that if the above distance is within a predetermined range, there is displayed, on a display device, a target position for alignment of at least one feature point contained in the face image of the person to be imaged, together with the face image of the person to be imaged repeatedly captured by the imaging device. As a result, this allows guiding the face of the person to be imaged to an appropriate position within the image, and allows enhancing the accuracy of the arrangement of the face of the person to be imaged with respect to a target position in the face image. The operator of the information processing device or of the imaging device can be guided smoothly, while reducing the annoyance felt by the operator, by performing the comparatively complex fine adjustment involved in adjusting the positions of feature points contained in the face of the person to be imaged, after the comparatively easy rough adjustment involved in adjusting the distance between the face of the person to be imaged and the imaging device.

In the determination step of one aspect of the present technology, the determination may be performed on the basis of the face image of the person to be imaged that is captured by the imaging device. Herein, the determination may be performed on the basis of a distance between two feature points in the face image captured by the imaging device. In the display step of one aspect of the present technology, there may be displayed target positions for alignment of the two feature points used in the determination step and another feature point that is not used in the determination step. Firstly, the positional relationship between the imaging device and the face of the person to be imaged is adjusted to some extent using two feature points; thereupon, the operator of the information processing device or of the imaging device can be guided through display of a target position for matching the positions of the two feature points and another one feature point. As a result, the operator can perform alignment of the three feature points more easily than when adjusting the position of three feature points all at once.

In the determination step of one aspect of the present technology, whether the distance between the face of the person to be imaged and the imaging device is within the predetermined range may be determined by determining whether a distance between center points of left and right eyes acquired from the face image of the person to be imaged as captured by the imaging device is within a predetermined error range with respect to a predetermined reference value. The distance between the center points of the left and right eyes of the face image becomes smaller as the distance between the face of the person to be imaged and the imaging device increases. The distance between the centers of the left and right eyes in the face image increases as the distance between the face of the person to be imaged and the imaging device decreases. Therefore, it becomes possible to determine whether the distance between the face of the person to be imaged and the imaging device is appropriate by acquiring the distance between the center points of the left and right eyes. The center points of the left and right eyes can be acquired easily by using, for instance, a face recognition program. Processing can be made easier as a result.

In one aspect of the present technology, there may be further included a guidance step of, when the distance between the face of the person to be imaged and the imaging device is determined not to be within the predetermined range, outputting a prompting for adjustment of the distance. In the guidance step of one aspect of the present technology, if the distance between the center points of the left and right eyes is smaller than a minimum value of the predetermined error range with respect to the predetermined reference value, a message urging shortening of the distance between the face of the person to be imaged and the imaging device may be displayed on the display device. In the guidance step of one aspect of the present technology, if the distance between the center points of the left and right eyes is greater than a maximum value of the predetermined error range with respect to the predetermined reference value, a message urging lengthening of the distance between the face of the person to be imaged and the imaging device may be displayed on the display device.

In the determination step of one aspect of the present technology, whether the distance between the face of the person to be imaged and the imaging device is within the predetermined range may be determined by determining whether an area of a triangle that joins center points of left and right eyes and a center point of a mouth acquired from the face image of the person to be imaged as captured by the imaging device is within a predetermined error range with respect to a predetermined reference value.

In one aspect of the present technology, there may be further included an imaging step of imaging a face of the person to be imaged if the at least one feature point contained in the face image of the person to be imaged as captured by the imaging device is positioned within a predetermined range having the target position as a reference point.

In one aspect of the present technology, the target position of at least one feature point contained in a one feature point contained in the face of a person to be imaged corresponds to the at least one feature point of a face model that is held beforehand in a storage device, and there may be further included a generation step of generating an object by pasting the face image of the person to be imaged that is captured in the imaging step in such a manner that the at least one feature point in the face image corresponds to the at least one feature point in the face model. In the object thus generated, the positions of at least one feature point are matched, with good precision, between the face image and the face model. A natural expression having little weirdness can be brought out thus in the object in the case of deformation of a site that comprises the above at least one feature point of the face model. Thus, a plurality of objects capable of exhibiting natural expressions can be generated by holding only one face model, without the need for holding a plurality of face models, through association of the target position of at least one feature point to a specific face model.

In one aspect of the present technology, there may be further included a step of acquiring a sex determination result and an age determination result of the person to be imaged, and in the display step, at least one from among the sex determination result and the age determination result of the face image of the person to be imaged may be further displayed.

Further, the present technology may be a method, system, information processing device or program recorded in a recording medium that is readable by a computer or some other device or equipment. Herein, a recording medium readable by a computer or the like denotes a recording medium that is readable by a computer or the like and in which information such as data and programs is stored electrically, magnetically, optically, mechanically or chemically.

For instance the present technology may be an information processing device that acquires a face image of a person to be imaged that is captured by an imaging device, comprising a determination unit that determines whether a distance between a face of the person to be imaged and the imaging device is within a predetermined range; and an output unit that, if the distance between the face of the person to be imaged and the imaging device is determined to be within the predetermined range by the determination unit, displays, on a display device, a target position for alignment of at least one feature point contained in the face image of the person to be imaged, together with the face image of the person to be imaged repeatedly captured by the imaging device.

The present technology allows enhancing the accuracy of the arrangement of an imaging target with respect to a target position in a captured image.

DESCRIPTION OF EMBODIMENT

Embodiments of the present technology are explained below with reference to accompanying drawings. The features of the below-described embodiments are illustrative in nature, and the present technology is not limited to the features of the embodiments.

<First embodiment>

The information processing program of the present technology is suitable for execution in any computer system. In the first embodiment, an instance will be explained where the information processing program of the present technology is executed in a foldable and portable game device as an example of a computer. The various processes in the present embodiments may be distributedly carried out in a plurality of networked computers, or, alternatively, in a network system wherein main processing is carried out by a server and the processing results are delivered thereafter to terminals on which the processing results are then displayed.

[Game Device Configuration]

FIG. 1, FIG. 2, FIG. 3A, FIG. 3B, FIG. 3C, and FIG. 3D are plan diagrams illustrated one example of the external appearance of a game device. The game device 10 illustrated in FIG. 1 to FIG. 3D has a built-in imaging unit (camera), and is able to capture an image by means of this imaging unit, display a captured image on a screen, and save data of a captured image. Furthermore, the game device 10 is able to execute a game program stored on an exchangeable memory card, or a game program received from a sever or other game device via a network. Moreover, the game device 10 is able to generate an image captured by a virtual camera set in a virtual space, by computer graphics processing, and display the image on a screen.

Figure 1:
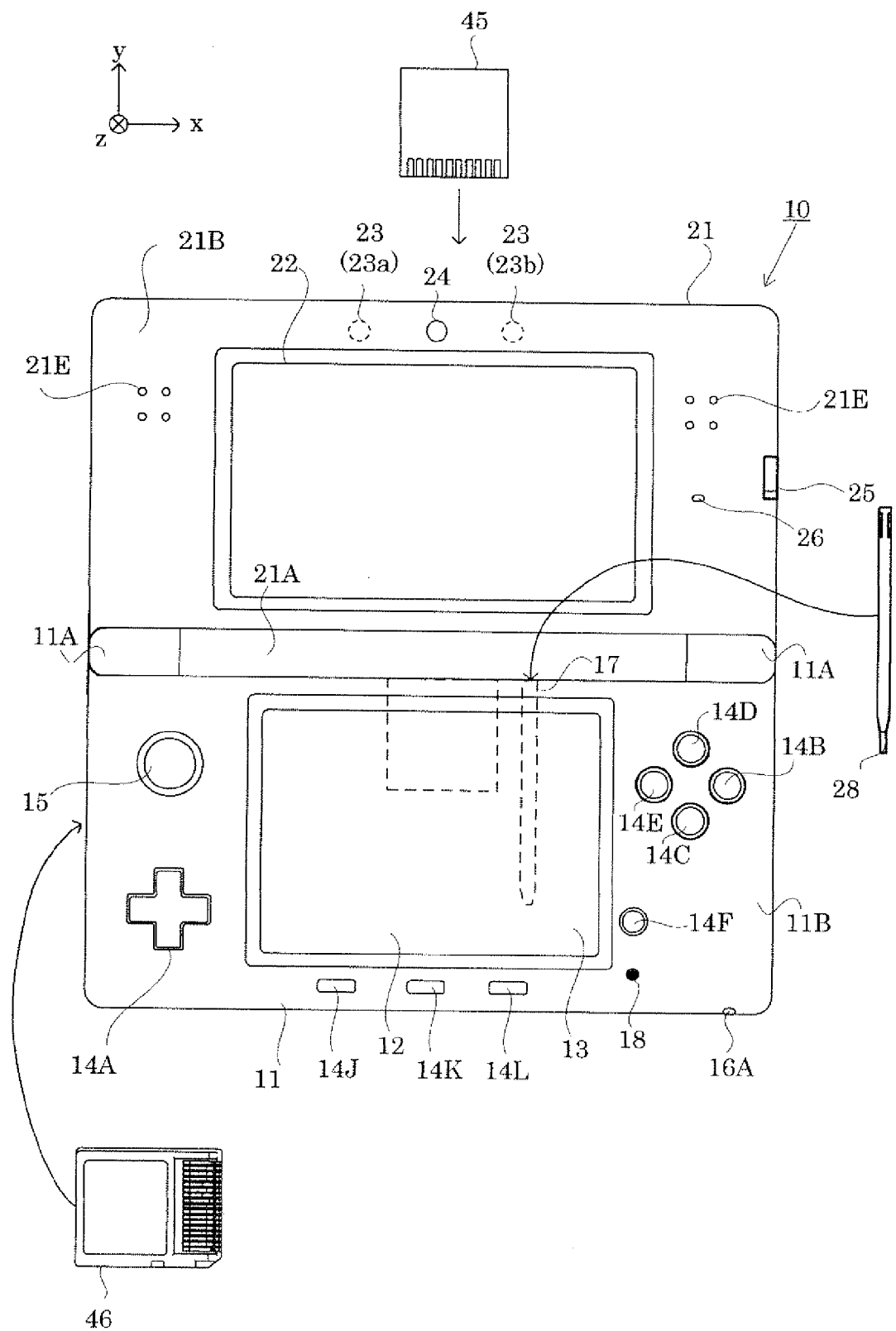
FIG. 1 is a front-view diagram illustrating an example of a game device in an open state.
Figure 2:
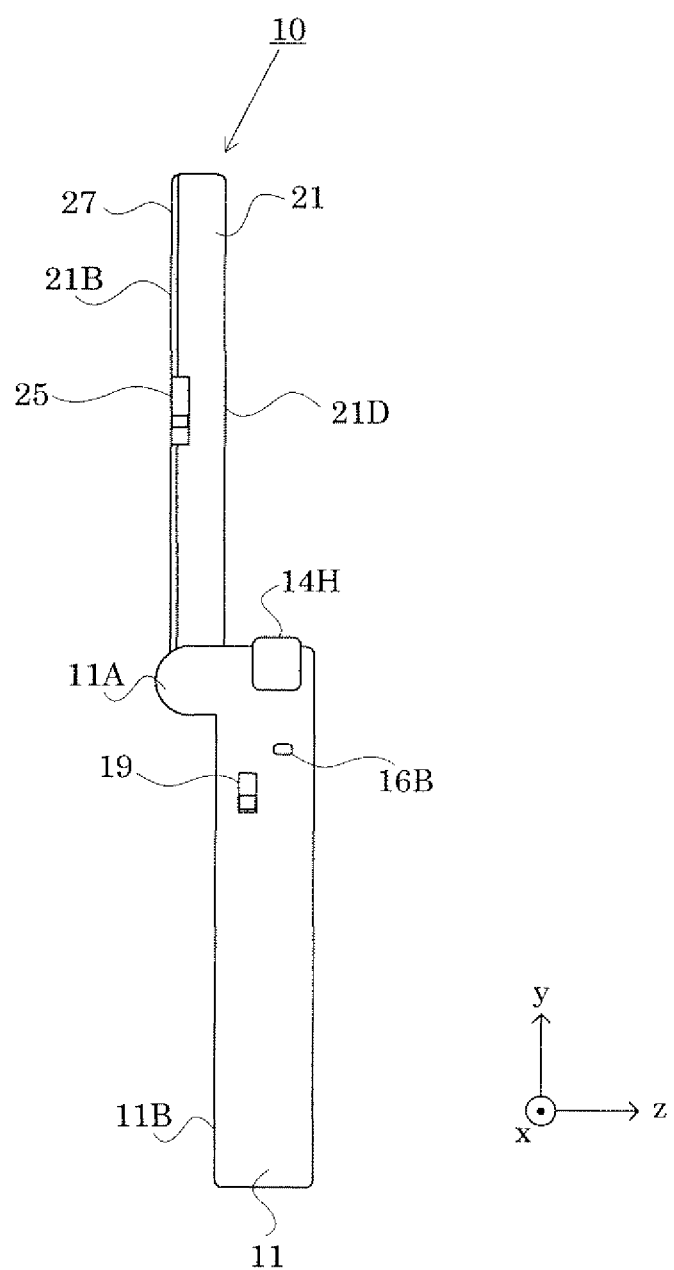
FIG. 2 is a right side-view diagram illustrating an example of a game device in an open state.
Figure 3:
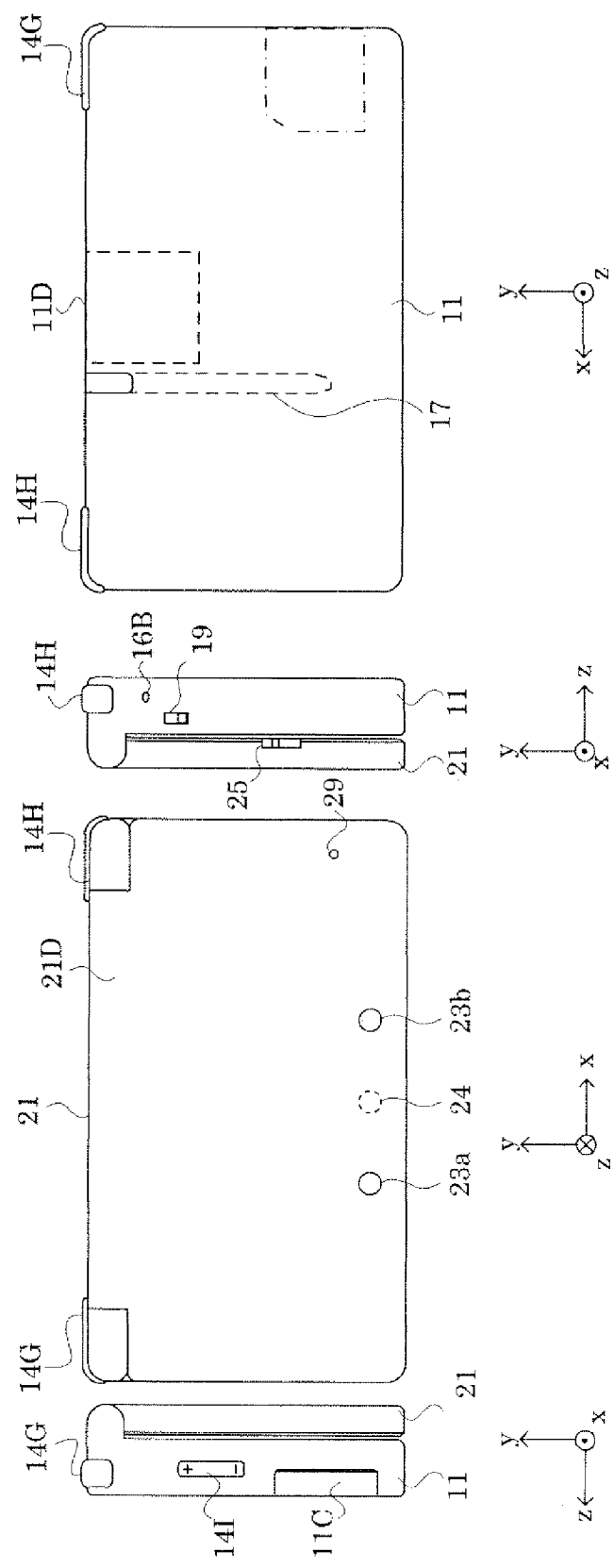
FIG. 3A is a left side-view diagram illustrating an example of a game device in a closed state.
FIG. 3B is a front-view diagram illustrating an example of a game device in a closed state.
FIG. 3C is a right side-view diagram illustrating an example of a game device in a closed state.
FIG. 3D is a rear-view diagram illustrating an example of a game device in a closed state.

The game device 10 illustrated in FIG. 1 to FIG. 3D has a lower housing 11 and an upper housing 21. The lower housing 11 and the upper housing 21 are coupled openably and closably (in a folding fashion) by means of a hinge structure. In other words, the upper housing 21 is installed rotatably (swingably) with respect to the lower housing 11. By this means, the game device 10 has two modes: a closed state where the upper housing 21 lies in close contact with the lower housing 11 (FIG. 3A and FIG. 3O), and a state (open state) where the upper housing 21 has been rotated with respect to the lower housing 11 and released from the state of close contact. As illustrated in FIG. 2, the upper housing 21 is allowed to rotate until reaching a position where the upper housing 21 and the lower housing 11 are substantially parallel in the open state (see FIG. 2).

FIG. 1 is a front view diagram illustrating one example of a game device 10 in an opened state (open state). The lower housing 11 and the upper housing 21 of the game device 10 are respectively formed in a horizontally-long rectangular plate shape having a planar shape with a long direction (horizontal direction (left/right direction): the x direction in FIG. 1) and a short direction ((vertical direction): the y direction in FIG. 1). The outer edge portion on the lower side in the lengthwise direction of the upper housing 21 and the outer edge portion on the upper side in the lengthwise direction of the lower housing 11 are coupled rotatably by means of a hinge structure. When the user uses the game device 10, the game device 10 is set to an open state. In addition, the game device 10 can be housed in a closed state. Furthermore, in the game device 10, the upper housing 21 can maintain a stationary state at any angle desired by the user with respect to the lower housing 11, due to a frictional force which is produced in the coupling portion with the lower housing 11. In other words, in the game device 10, the upper housing 21 can be halted at a desired angle with respect to the lower housing 11. In general, from the viewpoint of the visibility of a screen provided in the upper housing 21, the upper housing 21 is opened to a position forming a perpendicular angle or obtuse angle with respect to the lower housing 11. Below, when the game device 10 is in the closed state, the respectively opposing surfaces of the upper housing 21 and the lower housing 11 are called "inner surfaces" or "main surfaces". Furthermore, the respective surfaces of the upper housing 21 and the lower housing 11 on the opposite side to the inner surfaces (main surfaces) are called "outer surfaces".

Protrusions (bearing sections) 11A which protrude in a direction (the z direction in FIG. 1) perpendicular to the inner surface (main surface) 11B of the lower housing 11 are provided in the upper long edge portion of the lower housing 11 of the game device 10. Furthermore, a protrusion (bearing section) 21A which protrudes in a direction perpendicular to the lower surface of the upper housing 21 from this lower surface is provided in the lower long edge portion of the upper housing 21. A rotating axle (not illustrated) extending in the x direction from one protrusion 11A, through the protrusion 21A, to the other protrusion 11A is accommodated in the protrusions 11A, 21A, 11A, and the upper housing 21 is able to rotate relatively with respect to the lower housing 11 about this rotating axle. In this way, the lower housing 11 and the upper housing 21 are connected in a foldable fashion.

A lower LCD (Liquid Crystal Display) 12, a touch panel 13, operating buttons 14A to 14L, an analog stick 15, a first LED 16A and a microphone hole 18 are provided on the inner surface 11B of the lower housing which is illustrated in FIG. 1.

The lower LCD 12 is accommodated in the lower housing 11. The planar shape of the lower LCD 12 is a horizontally-long rectangular shape, the long edge direction thereof being arranged to coincide with the lengthwise direction of the lower housing 11 (the x direction in FIG. 1). The lower LCD 12 is provided in the center of the inner surface (main surface) of the lower housing 11. The screen of the lower LCD 12 is exposed via an opening section provided in the inner surface of the lower housing 11. When the game device 10 is not in use, it is possible to prevent soiling or scratching of the screen of the lower LCD 12 by setting the game device 10 to the closed state described above. The number of pixels of the lower LCD 12 is 320 dot×240 dot (horizontal×vertical), for instance. The lower LCD 12 is a display device which displays images in a planar view (not a stereoscopic view), in contrast to the upper LCD 22 which is described below. In the first embodiment, an LCD is used as a display device, but it is also possible to use another display device, such as one using EL (Electro Luminescence), for example. Moreover, for the lower LCD 12, it is possible to use a display device having a desired resolution.

The touch panel 13 is one of input devices of the game device 10. The touch panel 13 is installed so as to cover the screen of the lower LCD 12. In the first embodiment, the touch panel 13 employs a resistance film type of touch panel. However, the touch panel 13 is not limited to a resistance film type and it is also possible to use a touch panel based on any press operation method, such as an electrostatic capacitance method, or the like. Furthermore, in the first embodiment, the touch panel 13 is employed, which has the same resolution (detection accuracy) as the resolution of the lower LCD 12. Here, it is not especially necessary for the resolution of the touch panel 13 and the resolution of the lower LCD 12 to be matching.

The operating buttons 14A to 14L are input devices for performing predetermined inputs. Among the operating buttons 14A to 14L, a four-way button 14A (direction input button 14A), a button 14B, a button 14C, a button 14D, a button 14E, a power button 14F, a select button 14J, a home button 14K and a start button 14L are provided on the inner surface (main surface) of lower housing 11.

The four-way button 14A has a cross shape and includes at least buttons indicating upward, downward, leftward and rightward directions. The four-way button 14A is provided in the lower part of the region to the left-hand side of the lower LCD 12. The four-way button 14A is preferably located in a position where it can be operated by the thumb of a user's left hand when gripping the lower housing 11.

The four buttons, button 14B, button 14C, button 14D and button 14E, are situated in a cross shape in the upper part of the region to the right-hand side of the lower LCD 12. The button 14B, button 14C, button 14D and button 14E are preferably situated in a piece where the operations can be easily performed by the thumb of a user's right hand when gripping the lower housing 11. The power button 14F is situated in the lower part of the region to the right-hand side of the lower LCD 12.

The select button 14J, the home button 14K and the start button 14L are respectively situated in the region below the lower LCD 12.

The buttons 14A to 14E, the select button 14J, the home button 14K and the start button 14L are assigned appropriately to functions corresponding to a program which is executed by the game device 10. For example, the four-way button 14A is used for selection operations and character movement operations during a game, and the like. The operating buttons 14B to 14E, for example, are used for a setting operation or a canceling operation, or the like.

The power button 14F is used to switch the power supply of the game device 10 on and off.

The analog stick 15 is a device for indicating directions. The analog stick 15 is provided in the upper part of the region to the left-hand side of the lower LCD 12 on the inner surface (main surface) of the lower housing 11. More specifically, the analog stick 15 is provided above the four-way button 14A. Moreover, the analog stick 15 is preferably located in a position where it can be operated by the thumb of a user's left hand when gripping the lower housing 11. By providing the analog stick 15 in the upper part, the user can easily operate the analog stick 15 by the thumb of the user's left hand when gripping the lower housing 11. Furthermore, the user can easily press the four-way button 14A by slightly moving the thumb of the user's left hand down. The analog stick 15 is composed in such a manner that the top of the key slides in parallel with the inner surface of the lower housing 11. The analog stick 15 functions in accordance with the program being executed by the game device 10. For example, when a game in which a predetermined object appears in a three-dimensional virtual space is executed by the game device 10, the analog stick 15 functions as an input device for moving the predetermined object within the three-dimensional virtual space. In this case, the predetermined object is moved in the direction in which the key top of the analog stick 15 is slid. For the analog stick 15, it is possible to use a stick capable of producing an analog input by tilting by a predetermined amount in any one of the upward, downward, leftward or rightward directions or an oblique direction.

The four buttons, button 14B, button 14C, button 14D and button 14E, and the analog stick 15 are preferably disposed in laterally symmetrical positions on either side of the lower LCD 12. By this means, depending on the game program, a left-handed person, for example, is able to input a direction instruction by using the four buttons, button 14B, button 14C, button 14D and button 14E.

The first LED 16A (FIG. 1) notifies the user of the power on/off state of the game device 10. The first LED 16A is provided on the right-hand side of the edge portion common to the inner surface (main surface) of the lower housing 11 and the lower side face of the lower housing 11. By this means, the user is able to see whether or not the first LED 16A is lit, regardless of the open and closed state of the game device 10.

The microphone hole 18 is a hole for a microphone which is built into the game device 10 as a voice input device. The built-in microphone detects external sounds via the microphone hole 18. The microphone and the microphone hole 18 are provided below the power button 14F on the inner surface (main surface) of the lower housing 11.

An insertion hole 17 for a touch pen 28 (indicated by dotted lines in FIG. 1 and FIG. 3D) is provided in the upper side face of the lower housing 11. The touch pen 28 used for performing operations on the touch panel 13 can be accommodated via the insertion hole 17. Inputs via the touch panel 13 are usually performed using the touch pen 28. However, the user may also use his or her finger, instead of the touch pen 28.

The game device 10 and an insertion hole 11D (indicated by a dotted line in FIG. 1 and FIG. 3D) for inserting an external memory 45 on which a game program is recorded are provided in the upper side face of the lower housing 11. A connector (not illustrated) for electrically connecting the external memory 45 and an internal circuit in a detachable fashion is provided inside the insertion hole 11D. By connecting the external memory 45 to the game device 10, a predetermined game program is executed by a processor included in the internal circuit. The connector and the insertion hole 11D may be provided in another side face (for example, the right-hand side face) of the lower housing 11.

Speaker holes 21E, an upper LCD 22, an inside imaging unit 24, a 3D adjustment switch 25, and a 3D indicator 26 are provided on the inner surface 21B of the upper housing 21 illustrated in FIG. 1.

The upper LCD 22 is a display device which is capable of displaying stereoscopically viewable images. The upper LCD 22 is capable of displaying a left-eye image and a right-eye image using substantially the same display region. More specifically, the upper LCD 22 is a display device based on a method in which a left-eye image and a right-eye image are displayed alternately in predetermined units (for example, one column each) in the horizontal direction. The upper LCD 22 may also be a display device based on a method in which a left-eye image and a right-eye image are displayed alternately. Furthermore, the upper LCD 22 is a display device producing a display which can be viewed stereoscopically with the naked eye. In this case, the upper LCD 22 employs a lenticular method or parallax barrier method in such a manner that a left-eye image and a right-eye image which are displayed alternatively in the horizontal direction are viewed separately by the left eye and the right eye, respectively. In the first embodiment, the upper LCD 22 is a display device based-on a parallax barrier method. The upper LCD 22 displays an image (stereoscopic image) which can be viewed stereoscopically with the naked eye, by using a left-eye image and a right-eye image. More specifically, the upper LCD 22 is able to display a stereo image (a stereoscopically viewable image) which creates a three-dimensional impression for the user, by causing the left-eye image and the right-eye image to be viewed respectively by the user's left eye and the user's right eye, by means of a parallax barrier. Furthermore, in the upper LCD 22, the parallax barrier can be disabled, and when the parallax barrier is disabled, an image can be displayed in planar view (the opposite of the stereoscopic view described above; in other words, a display mode in which the same displayed image is viewed by both the right eye and the left eye). In this way, the upper LCD 22 is a display device capable of switching between a stereoscopic display mode which displays a stereoscopically viewable image and a planar display mode which displays an image in planar view (displays a planar image). This switching of the display mode is performed by means of a 3D adjustment switch 25, which is described below.

The upper LCD 22 is accommodated in the upper housing 21. The upper LCD 22 is a horizontally long rectangular shape, and is arranged in the center of the upper housing 21 with the long edge direction coinciding with the long edge direction of the upper housing 21. The surface area of the screen of the upper LCD 22 is set to be larger than the surface area of the screen of the lower LCD 12, for example. More specifically, the screen of the upper LCD 22 is set to have a greater horizontal length than the screen of the lower LCD 12. More specifically, the ratio of the horizontal width in the aspect ratio of the screen in the upper LCD 22 is set to be greater than the ratio of the horizontal width in the aspect ratio of the screen in the lower LCD 12.

The screen of the upper LCD 22 is provided on the inner surface (main surface) 215 of the upper housing 21, and the screen of the upper LCD 22 is exposed via an opening section provided in the inner surface 21B of the upper housing 21. Furthermore, the inner surface of the upper housing 21 is covered with a transparent screen cover 27. The screen cover protects the screen of the upper LCD 22 and is also integrated with the upper LCD 22 and the inner surface of the upper housing 21 so as to create a unified impression. The number of pixels of the upper LCD 22 is 800 dot×240 dot (horizontal× vertical), for instance. In the first embodiment, the upper LCD 22 is described as being a liquid crystal device. However, it is not limited to this and a display device using EL, or the like, for example, may also be used. Furthermore, it is possible to use a display device of any resolution for the upper LCD 22.

The speaker holes 215 are holes for outputting sound from a speaker 44 which is a sound output device of the game device 10. The speaker holes 21E are disposed in lateral symmetry on either side of the upper LCD. Sound from speakers 44, which are described below, is output via the speaker holes 21E.

The inside imaging unit 24 is an imaging unit having an imaging direction in an inward normal direction to the inner surface 215 of the upper housing 21. The inside imaging unit 24 includes an imaging element having a predetermined resolution and a lens. The imaging element is, for example, a CCD image sensor, a CMOS image sensor, or the like. The lens may include a zoom mechanism.

The inside imaging unit 24 is disposed above the upper end of the screen of the upper LCD 22 on the inner surface 21B of the upper housing 21, in a central position in the left/right direction of the upper housing 21 (on a line which divides the upper housing 21 (the screen of the upper LCD 22) into two equal parts in the left/right direction). By arranging the inside imaging unit 24 in this way, it is possible to capture an image of the user's face from the front side with the inside imaging unit 24, when the user is looking straight at the upper LCD 22. An outside left imaging unit 23a and an outside right imaging unit 23b are described below.

The 3D adjustment switch 25 is a sliding switch, which is used to switch the display mode of the upper LCD 22, as described previously. Furthermore, the 3D adjustment switch 25 is used to adjust the three-dimensional impression of the stereoscopically viewable image (stereo image) displayed on the upper LCD 22. The 3D adjustment switch 25 is provided in the edge portion of the upper housing 21 which is common to the inner surface 21B and the right side face, so as to be visible by the user regardless of the open and closed state of the game device 10. The 3D adjustment switch 25 has a slider which can be slid to any position in a predetermined direction (for example, the up/down direction), the display mode of the upper LCD 22 being set in accordance with the position of the slider.

For example, if the slider of the 3D adjustment switch 25 is situated in the lowest position, then the upper LCD 22 is set to planar display mode, and a planar image is displayed on the screen of the upper LCD 22. It is also possible to provide a planar display by leaving the upper LCD 22 in the stereoscopic display mode and using the same image for the left-eye image and the right-eye image. On the other hand, if the slider is situated to the upper side of lowest position described above, then the upper LCD 22 is set to stereoscopic display mode. In this case, a stereoscopically viewable image is displayed on the screen of the upper LCD 22. Here, if the slider is situated above the lowest position, then the appearance of the stereo image is adjusted in accordance with the position of the slider. More specifically, the amount of displacement of the lateral direction positions of the right-eye image and the left-eye image is adjusted in accordance with the position of the slider.

The 3D indicator 26 indicates whether the upper LCD 22 is in stereoscopic display mode. For example, the 3D indicator 26 is an LED, which lights up when the stereoscopic display mode of the upper LCD 22 is enabled. The 3D indicator 26 is provided on the inner surface 21B of the upper housing 21, and in the vicinity of the screen of the upper LCD 22. Consequently, if the user is looking straight at the screen of the upper LCD 22, the user is able to see the 3D indicator 26 easily. Therefore, the user is able readily to identify the display mode of the upper LCD 22, even while looking at the screen of the upper LCD 22.

FIG. 2 is a front right side diagram illustrating one example of the game device 10 in an open state. A second LED 16B, a wireless switch 19 and a R button 14H are provided in the right side face of the lower housing 11. By lighting up, the second LED 16B notifies the user of the established status of wireless communication of the game device 10. The game device 10 is able to perform wireless communication with other devices, and the second LED 16B lights up when wireless communication with another device has been established. The game device 10 has a function of connecting to a wireless LAN by a method conforming to the IEEE 802.11b/g standard, for example. The wireless switch 19 enables or disables the wireless communication function. The R button 14H is described below.

FIG. 3A is a left side diagram illustrating one example of a game device 10 in a closed state. An openable cover section 11C, an L button 14H and a volume button 14I are provided on the left side face of the lower housing 11 shown in FIG. 3A. The volume button 14I is a button for adjusting the volume of the speakers 44 provided in the game device 10.

A connector (not illustrated) for electrically connecting the game device 10 with an external data memory 46 (see FIG. 1) is provided on the inside of the cover section 11C. The external data memory 46 is installed detachably in the connector. The external data memory 46 is used, for example, to store (save) data of images captured by the game device 10. The connector and the cover section 11C may also be provided on the right side face of the lower housing 11. The button 14H is described below.

FIG. 3B is a front view diagram illustrating one example of the game device 10 in a closed state. An outside left imaging unit 23*a*, an outside right imaging unit 23*b* and a third LED 29 are provided in the outer surface of the upper housing 21 illustrated in FIG. 3B.

The outside left imaging unit 23*a* and the outside right imaging unit 23*b* respectively include an imaging element having a predetermined common resolution (for example, a CCD image sensor or a CMOS image sensor, or the like), and a lens. The lens may include a zoom mechanism. The imaging direction of both the outside left imaging unit 23*a* and the outside right imaging unit 23*b* is an outward normal direction from the outer surface 21D. In other words, the imaging direction (visual axis of the camera) of the outside left imaging unit 23*a* and the imaging direction of the outside right imaging unit 23*b* are mutually parallel. The outside left imaging unit 23*a* and the outside right imaging unit 23*b* are referred to jointly below as the outside imaging unit 23.

The outside left imaging unit 23*a* and the outside right imaging unit 23*b* which constitute the outside imaging unit 23 are arranged in line in the horizontal direction of the screen of the upper LCD 22. In other words, the outside left imaging unit 23*a* and the outside right imaging unit 23*b* are arranged in such a manner that a straight line linking the outside left imaging unit 23*a* and the outside right imaging unit 23*b* lies in the horizontal direction of the screen of the upper LCD 22. Furthermore, if the user turns the upper housing 21 to a predetermined angle (for example, 90°) with respect to the lower housing 11 and views the screen of the upper LCD 22 from the front, then the outside left imaging unit 23*a* is positioned on the left-hand side of the user viewing the screen and the outside right imaging unit 23*b* is positioned on the right-hand side of the user viewing the screen (see FIG. 1). The distance between the outside left imaging unit 23*a* and the outside right imaging unit 23*b* is set to approximately the distance between a person's eyes, for example, this distance may be set in the range of 30 mm to 70 mm. However, the distance between the outside left imaging unit 23*a* and the outside right imaging unit 23*b* is not limited to this range. In the first embodiment, the outside left imaging unit 23*a* and the outside right imaging unit 23*b* are fixed to the upper housing 21 and the imaging direction thereof cannot be changed.

The outside left imaging unit 23*a* and the outside right imaging unit 23*b* are respectively disposed in symmetrical positions with respect to a line dividing the upper LCD 22 (upper housing 21) into two equal parts in the left/right direction. Furthermore, the outside left imaging unit 23*a* and the outside right imaging unit 23*b* are disposed in the upper part of the upper housing 21 on the rear side of positions above the upper end of the screen of the upper LCD 22, when the upper housing 21 is open (see FIG. 1). In other words, the outside left imaging unit 23*a* and the outside right imaging unit 23*b* are disposed on the outer surface of the upper housing 21, above the upper end of the screen of the upper LCD 22 when the upper LCD 22 is projected to a position on the outer surface.

In this way, by arranging the outside left imaging unit 23*a* and the outside right imaging unit 23*b* in linear symmetry with respect to the central line in the short edge direction of the upper LCD 22, the respective imaging directions of the outside imaging unit 23 can be made to coincide with the respective lines of sight of the user's left and right eyes, when the user is looking straight at the upper LCD 22. Furthermore, because the outside imaging unit 23 is disposed in a rear side position above the upper end of the screen of the upper LCD 22, then there is no interference between the outside imaging unit 23 and the upper LCD 22 inside the upper housing 21. Moreover, the outside left imaging unit 23*a* and the outside right imaging unit 23*b* are provided in lateral symmetry on either side of the projected position of the inside imaging unit 24, when the inside imaging unit 24, which is provided on the inner surface of the upper housing 21, is projected to the outer surface of the upper housing 21, as indicated by the dotted line in FIG. 3B. Consequently, is possible to make the upper housing 21 thinner compared to a case where the outside imaging unit 23 is disposed to the rear side of the screen of the upper LCD 22 or a case where the outside imaging unit 23 is disposed to the rear side of the inside imaging unit 24.

The outside left imaging unit 23*a* and the outside right imaging unit 23*b* can be used as stereo cameras by the program executed by the game device 10. Furthermore, either one of the two outside imaging elements (the outside left imaging unit 23*a* and the outside right imaging unit 23*b*) can be used independently depending on the program, allowing the outside imaging unit 23 to be used as a non-stereo camera. If executing a program which uses the outside imaging units 23*a* and 23*b* as stereo cameras, the outside left imaging unit 23*a* captures a left-eye image which is seen by the user's left eye and the outside right imaging unit 23*b* captures a right-eye image which is seen by the user's right eye. Furthermore, the program can also synthesize images captured by the two outside imaging units (the outside left imaging unit 23*a* and the outside right imaging unit 23*b*), or use the images in complementary fashion to perform imaging in an expanded imaging range. Moreover, it is also possible to generate a left-eye image and a right-eye image having parallax, from a single image captured by one of the outside imaging units 23*a* and 23*b*, so as to produce a pseudo-stereo image just like one captured by two cameras. In generating a pseudo-stereo image of this kind, the distance between the virtual cameras can be set as desired.

The third LED 29 lights up when the outside imaging unit 23 is operating, thereby indicating that the outside imaging unit 23 is operating. The third LED 29 is provided in the vicinity of the outside imaging unit 23 on the outer surface of the upper housing 21.

FIG. 3C is a right side diagram illustrating one example of the game device 10 in a closed state. FIG. 3D is a rear view diagram illustrating one example of the game device 10 in a closed state.

An L button 14G and an R button 14H are provided on the upper surface of the lower housing 11 illustrated in FIG. 3D. The L button 140 is provided in the left end portion ad the upper surface of the lower housing 11 and the R button 14H is provided in the right end portion of the upper surface of the lower housing 11. The L button 14G and the R button 14H are assigned to appropriate functions corresponding to the program executed by the game device 10. For example, the L button 14G and the R button 14H function as shutter buttons (imaging instruction buttons) for the respective imaging units.

Although not illustrated the drawings, a rechargeable battery forming a power source for the game device 10 is accommodated in the lower housing 11, and this battery can be recharged via a terminal provided in a side face (for example, the upper side face) of the lower housing 11.

Figure 4:
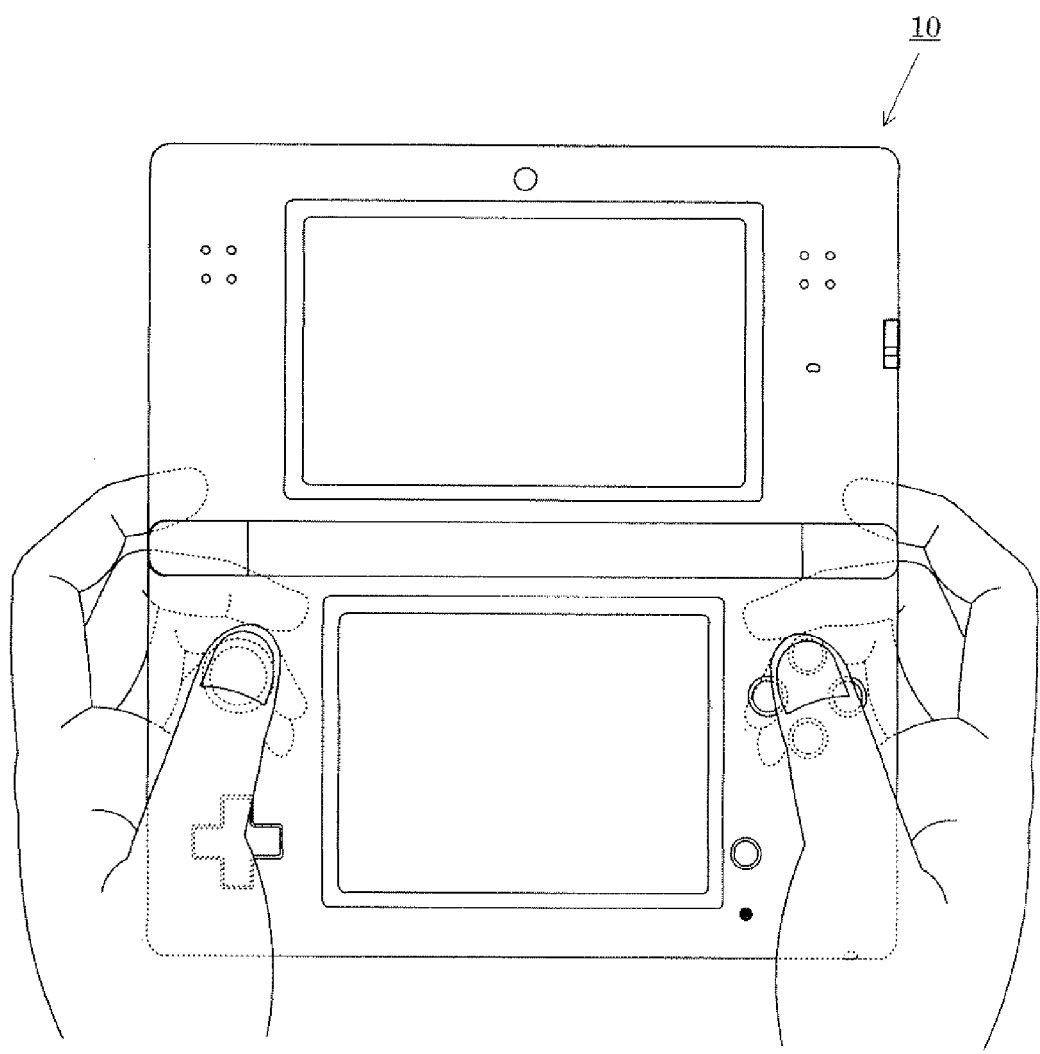
FIG. 4 is a diagram illustrating a state in which the palms, middle fingers, ring fingers and small fingers of both hands of a user are gripping side faces and the outer face (face on the reverse side of the inner face) of a lower housing, with a lower LCD and an upper LCD point towards the user.
Figure 5:
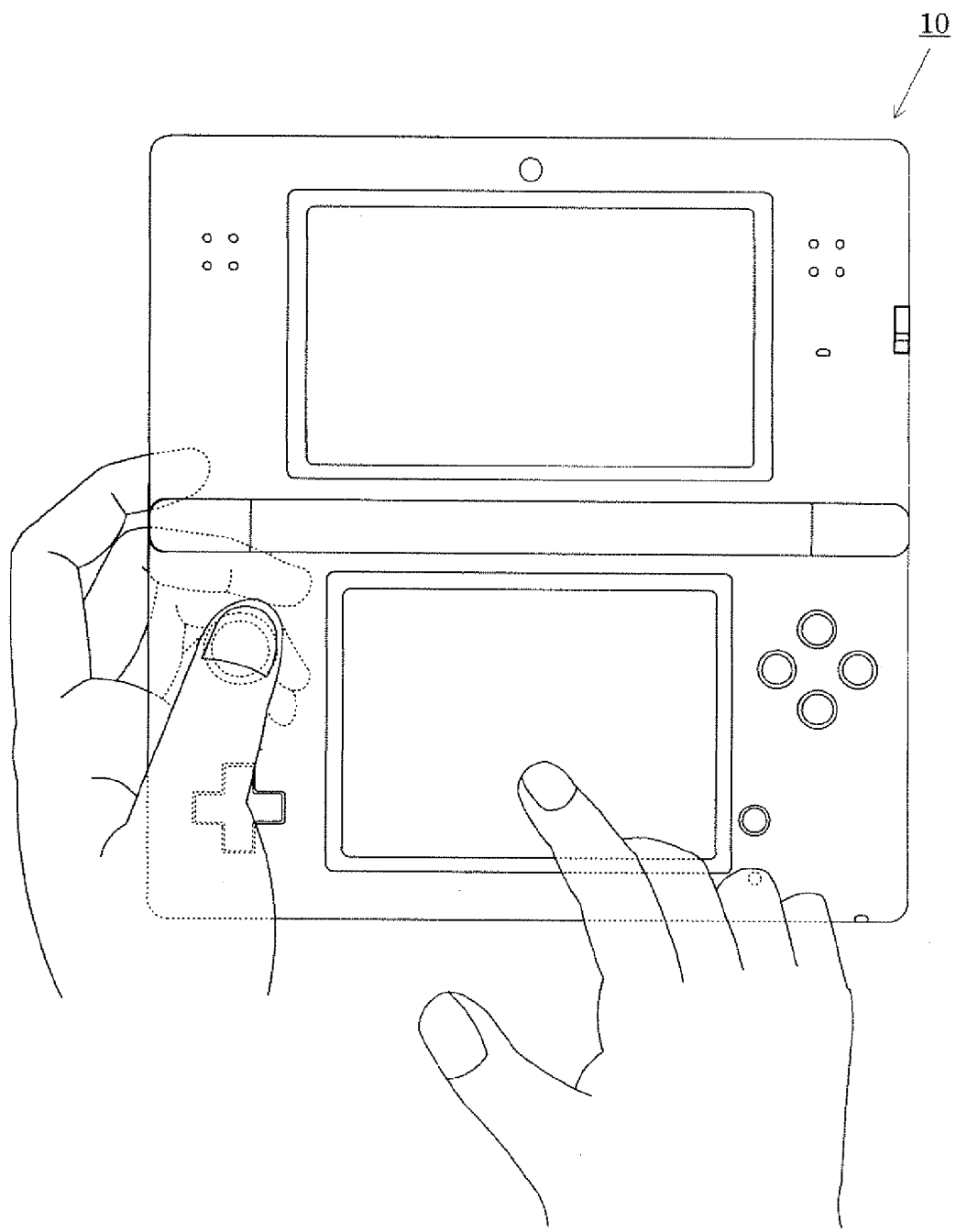
FIG. 5 is a diagram illustrating an example in which a user grips a game device with one hand.

FIG. 4 and FIG. 5 respectively illustrate one example of the state of use of the game device 10. FIG. 4 is a diagram showing one example of a situation where a user is gripping the game device 10 with both hands.

In the example illustrated in FIG. 4, the user grips the inner surface and the outer surface (the surface on the opposite side to the inner surface) of the lower housing with the palm, middle finger, fourth finger and little finger of each hand, with the lower LCD 12 and the upper LCD 22 facing towards the user. By gripping the device in this way, the user is able to operate the operating buttons 14A to 14E and the analog stick 15 with his or her left and right thumbs and operate the L button 14G and the R button 14H with his or her left and right index fingers, while gripping the lower housing 11.

FIG. 5 is a diagram illustrating one example of a situation where a user is gripping the game device 10 with one hand. In the example illustrated in FIG. 5, when making an input to the touch panel 13, the user releases one of the hands gripping the lower housing 11 and grips the lower housing 11 with the other hand only. By this means, the user is able to make inputs to the touch panel 13 with the released hand.

Figure 6:
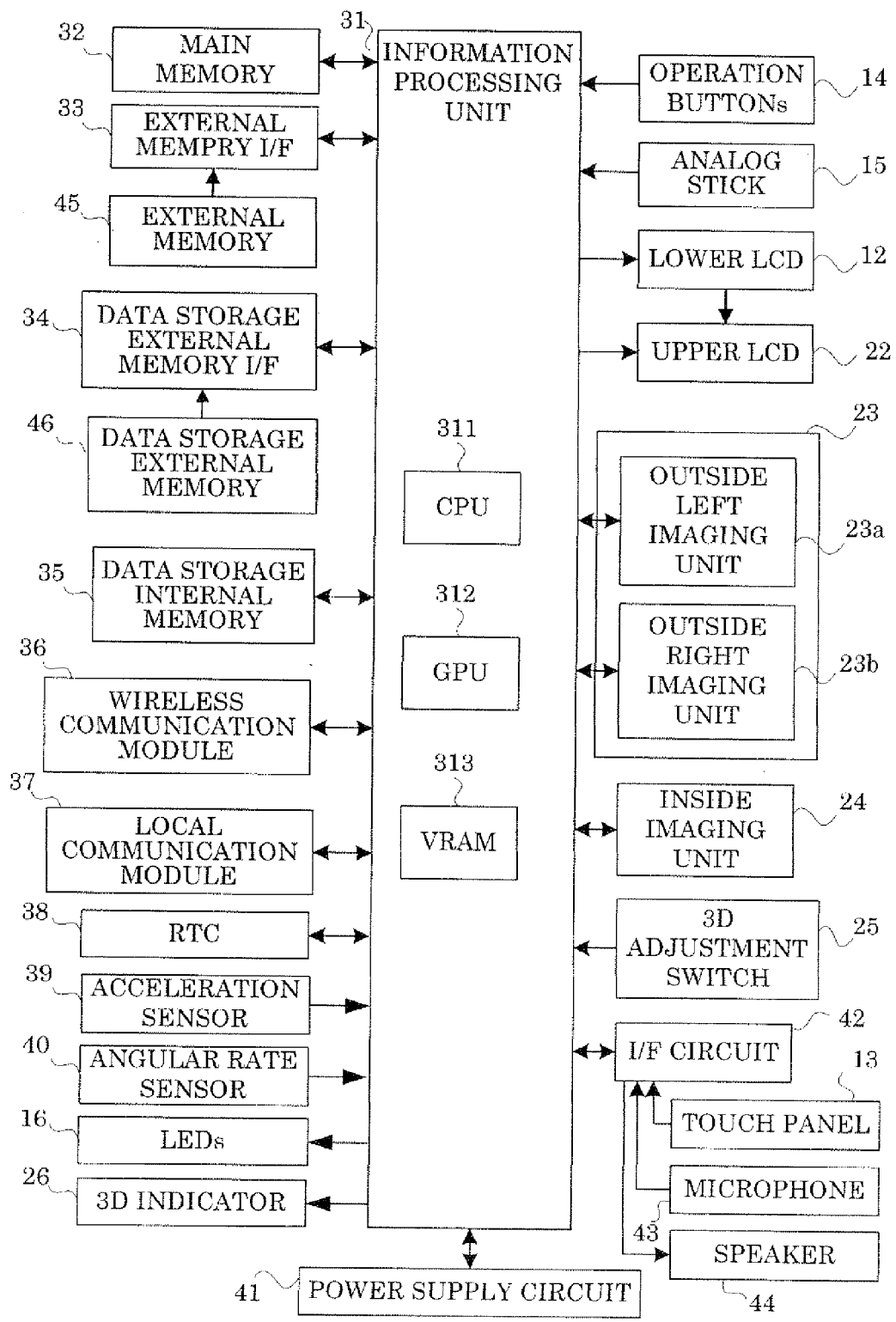
FIG. 6 is a block diagram illustrating an example of the internal configuration of a game device.

FIG. 6 is a block diagram illustrating one example of the internal composition of the game device 10. The game device 10 includes, in addition to the constituent parts described above, electronic components, such as an information processing unit 31, a main memory 32, an external memory interface (external memory I/F) 33, an external data memory I/F 34, an internal data memory 35, a wireless communication module 36, a local communication module 37, a real-time clock (RTC) 38, an acceleration sensor 39, an angular rate sensor 40, a power supply circuit 41 and an interface circuit (I/F circuit) 42, and the like. These electronic components are mounted on an electronic circuit board and are accommodated inside the lower housing 11 (or inside the upper housing 21).

The information processing unit 31 is information processing means comprising a CPU (Central Processing Unit) 311 for executing a predetermined program and a GPU (Graphics Processing Unit) 312 for performing image processing, or the like. In the first embodiment, the predetermined program is stored in a memory inside the game device 10 (for example, an external memory 45 connected to the external memory I/F 33 or the internal data memory 35). The CPU 311 of the information processing unit 31 executes image processing and game processing as described below, by executing the predetermined program. The program executed by the CPU 311 of the information processing unit 31 may be acquired from another device by means of communication with the other device. Furthermore, the information processing unit 31 includes a VRAM (Video RAM) 313. The GPU 312 of the information processing unit 31 generates an image in accordance with a command from the CPU 311 of the information processing unit 31 and renders the image in the VRAM 313. The GPU 312 of the information processing unit 31 outputs the image rendered in the VRAM 313 to the upper LCD 22 and/or the lower LCD 12, and this image is displayed on the upper LCD 22 and/or the lower LCD 12.

The main memory 32, external memory I/F 33, external data memory I/F 34, and internal data memory 35 are connected to the information processing unit 31. The external memory I/F 33 is an interface for detachably connecting the external memory 45. Furthermore, the external data memory I/F 34 is an interface for detachably connecting the external data memory 46.

The main memory 32 is volatile storage means which is used as a work area or buffer area of the information processing unit 31 (CPU 311). In other words, the main memory 32 temporarily stores various data used in image processing and game processing, and temporarily stores a program acquired from an external source (the external memory 45, another device, or the like). In the first embodiment, a PSRAM (Pseudo-SRAM), for example, is used as the main memory 32.

The external memory 45 is non-volatile storage means for storing a program which is executed by the information processing unit 31. The external memory 45 is composed by a read-only semiconductor memory, for example. When the external memory 45 is connected to the external memory I/F 33, the information processing unit 31 is able to read a program stored in the external memory 45. Predetermined processing is carried out by executing the program read in by the information processing unit 31. The external data memory 46 is constituted by a non-volatile rewriteable memory (for example, a NAND type flash memory), and is used to store predetermined data. For example, images captured by the outside imaging unit 23 or images captured by another device are stored in the external data memory 46. When the external data memory 46 is connected to the external data memory I/F 34, the information processing unit 31 is able to read in images stored in the external data memory 46 and display the images on the upper LCD 22 and/or the lower LCD 12.

The internal data memory 35 is constituted by a non-volatile rewriteable memory (for example, a NAND type flash memory), and is used to store predetermined data. For example, data and programs downloaded by wireless communication via the wireless communication module 36 are stored in the internal data memory 35.

The wireless communication module 36 has a function of connecting to a wireless LAN by a method conforming to the IEEE 802.11b/g standard, for example. Furthermore, the local communication module 37 has a function of performing wireless communication with a game device of the same type, by means of a predetermined communication method (for example, infrared communication). The wireless communication module 36 and the local communication module 37 are connected to the information processing unit 31. The information processing unit 31 can use the wireless communication module 36 to send and receive data to and from other devices via the Internet, and can use the local communication module 37 to send and receive data to and from other game devices of the same type.

The acceleration sensor 39 is connected to the information processing unit 31. The acceleration sensor 39 determines the magnitude of acceleration (linear acceleration) in linear directions following three axial directions (in the present embodiment, the xyz axes). The acceleration sensor 39 is provided inside the lower housing 11, for example. As illustrated in FIG. 1, the acceleration sensor 39 respectively determines the magnitude of the linear acceleration of the game device 10 produced in each axial direction, taking the x axis to be the long edge direction of the lower housing 11, taking the y axis to be the short edge direction of the lower housing 11, and taking the z axis to be direction perpendicular to the inner surface (main surface) of the lower housing 11. The acceleration sensor 39 is, for instance, an electrostatic capacitance type of acceleration sensor, but it is also possible to use an acceleration sensor based on another method. Furthermore, the acceleration sensor 39 may also be an acceleration sensor which determines acceleration in one axial direction or two axial directions. The information processing unit 31 receives data indicating the acceleration as determined by the acceleration sensor 39 (acceleration data), and calculates the attitude and movement of the game device 10.

The angular rate sensor 40 is connected to the information processing unit 31. The angular rate sensor 40 respectively determines the angular velocity produced about the three axes of the game device 10 (in the present embodiment, the xyz axes), and outputs data indicating the determined angular velocities (angular velocity data) to the information processing unit 31. The angular rate sensor 40 is provided inside the lower housing 11, for example. The information processing unit 31 receives angular velocity data output from the angular rate sensor 40 and calculates the attitude and movement of the game device 10.

The RTC 38 and power supply circuit 41 are connected to the information processing unit 31. The RTC 38 outputs a time count to the information processing unit 31. The information processing unit 31 calculates a current time (and date) on the basis of the time measured by the RTC 38. The power supply circuit 41 controls the power from the power source of the game device 10 (the rechargeable battery accommodated in the lower housing 11) and supplies power to the respective components of the game device 10.

The I/F circuit 42 is connected to the information processing unit 31. The microphone 43, speakers 44 and touch panel 13 are connected to the I/F circuit 42. More specifically, the speakers 44 are connected to the I/F circuit 42 via an amplifier which is not illustrated. The microphone 43 detects the user's voice and outputs an audio signal to the I/F circuit 42. The amplifier amplifies the audio signal from the I/F circuit 42, and outputs sound to the speakers 44. The I/F circuit 42 includes an audio control circuit which controls the microphone 43 and the speakers 44 (amplifier), and a touch panel control circuit which controls the touch panel 13. The audio control circuit performs A/D conversion and D/A conversion of the audio signal, or converts the audio signal to audio data of a predetermined format. The touch panel control circuit generates touch position data of a predetermined format on the basis of a signal from the touch panel 13 and outputs the touch position data to the information processing unit 31. The touch position data indicates the coordinates of a position where an input has been made (touch position) on the input surface of the touch panel 13. The touch panel control circuit reads in a signal from the touch panel 13 and generates touch position data at a rate of once every predetermined time period. The information processing unit 31 can identify the touch position where input has been made on the touch panel 13, by acquiring the touch position data.

The operating buttons 14 include the operating buttons 14A to 14L mentioned above, and are connected to the information processing unit 31. Operating data indicating the input status of the respective operating buttons 14A to 14l (whether or not the button is pressed) is output to the information processing unit 31 from the operating buttons 14. The information processing unit 31 executes processing in accordance with the inputs to the operating buttons 14, by acquiring operating data from the operating buttons 14.

The lower LCD 12 and the upper LCD 22 are connected to the information processing unit 31. The lower LCD and the upper LCD 22 display images in accordance with instructions from the information processing unit 31 (GPU 312). In the first embodiment, the information processing unit 31 causes an image for a handwritten image input operation to be displayed on the lower LCD 12, and causes an image acquired by either the outside imaging unit 23 or the inside imaging unit 24 to be displayed on the upper LCD 22. In other words, the information processing unit 31 causes a stereo image (a stereoscopically viewable image) using a right-eye image and a left-eye image captured by the outside imaging unit 23 to be displayed on the upper LCD 22, or causes a planar image captured by the inside imaging unit 24 to be displayed on the upper LCD 22, or causes a planar image using one of the right-eye image and the left-eye image captured by the outside imaging unit 23 to be displayed on the upper LCD 22.

More specifically, the information processing unit 31 is connected to an LCD controller (not illustrated) of the upper LCD 22, and controls the on/off switching of the parallax barrier in the LCD controller. If the parallax barrier of the upper LCD 22 is switched on, then the right-eye image and the left-eye image stored in the VRAM 313 of the information processing unit 31 (images captured by the outside imaging unit 23) are output to the upper LCD 22. More specifically, the LCD controller reads out a right-eye image and a left-eye image from the VRAM 313 by alternately repeating a process of reading out pixel data for one line in the vertical direction in respect of the right-eye image and a process of reading out pixel data for one line in the vertical direction in respect of the left-eye image. By this means, the right-eye image and the left-eye image are divided into strip-shaped images in which pixels are aligned vertically for each line, and an image formed by alternately arranging the divided strip-shaped images of the right-eye image and strip-shaped images of the left-eye image is displayed on the screen of the upper LCD 22. When this image is viewed by the user via the parallax barrier of the upper LCD 22, the right-eye image is viewed by the user's right eye and the left-eye image is viewed by the user's left eye. By this means, a stereoscopically viewable image is displayed on the screen of the upper LCD 22.

The outside imaging unit 23 and the inside imaging unit 24 are connected to the information processing unit 31. The outside imaging unit 23 and the inside imaging unit 24 capture images in accordance with an instruction from the information processing unit 31, and output captured image data to the information processing unit 31. In the first embodiment, an imaging instruction is issued to either one of the outside imaging unit 23 and the inside imaging unit 24, and the imaging unit receiving the imaging instruction captures an image and sends image data to the information processing unit 31. More specifically, an imaging unit to be used is selected by an operation performed by the user via the touch panel 13 or the operating buttons 14. The information processing unit 31 (CPU 311) detects that an imaging unit has been selected and duly issues an imaging instruction to the outside imaging unit 23 or the inside imaging unit 24.

When the outside imaging unit 23 or the inside imaging unit 24 is started up by an instruction from the information processing unit 31 (CPU 311), imaging is performed at a rate of 60 frames per second, for example. The images captured by the outside imaging unit 23 or the inside imaging unit 24 are successively supplied to the information processing unit 31, and displayed on the upper LCD 22 or the lower LCD 12 by the information processing unit 31 (CPU 312). When the captured images are output to the information processing unit 31, the images are stored in the VRAM 313 and output to the upper LCD 22 or the lower LCD 12, and then deleted at a predetermined timing. As described above, by capturing images at a rate of, for example, 60 frames per second by means of the game device 10, and displaying the captured images, the scene in the imaging range of the outside imaging unit 23 and the inside imaging unit 24 is displayed in real time on the upper LCD 22 or the lower LCD 12.

The 3D adjustment switch 25 is connected to the information processing unit 31. The 3D adjustment switch 25 sends an electric signal corresponding to the position of the slider to the information processing unit 31.

The 3D indicator 26 is connected to the information processing unit 31. The information processing unit 31 controls the lighting up of the 3D indicator 26. For example, if the upper LCD 22 is in stereoscopic display mode, then the information processing unit 31 causes the 3D indicator 26 to light up.

<Imaging of Face Images and Generating of Three-Dimensional Face Object in the Game Device 10>

In the first embodiment there is explained an example of person face imaging using the game device 10 that is explained with reference to FIG. 1 to FIG. 6. In the first embodiment a three-dimensional face object is generated through pasting of a captured face image onto a three-dimensional shape model of a face. The generated three-dimensional face object may be used, for instance, as a character in various types of games. The expression of a face image can be modified by moving control points that make up the three-dimensional shape model of the face. Specifically, a character can be made to wink by moving the control points that make up the periphery of an eye in the three-dimensional shape model. An expression that involves opening of the mouth can be displayed by moving the control points that make up the periphery of the mouth.

The game device 10, for instance, generates a three-dimensional face object by pasting, onto a three-dimensional shape model, one face image that is captured by the outside imaging unit 23 or the inside imaging unit 24, in order make a character out of the face of the operator (hereafter also referred to as user) of the game device 10, or the face of a person standing close to the operator, on the spot and in a simple manner. The face image that is pasted onto the three-dimensional shape model is preferably an image that is captured from the front of the person to be imaged. In cases where one face image, i.e. a face image captured in one direction, is pasted onto a three-dimensional shape model, animations are often created such that there are no substantial differences between the shape of the face of the person to be imaged and the shape of the three-dimensional shape model. In a case where the left and right eyes and the mouth of the three-dimensional shape model are deformed, however, it is preferable to acquire a face image in which the positions of the left and right eyes and the mouth match the positions of the left and right eyes and the mouth in the three-dimensional shape model, in order to realize animation that is close to the expression of an actual person, but without eliciting a sense of visual weirdness. Adjustment of the position of the face is performed by the user of the game device 10 at a time when the user captures images of his/herself or of somebody else using the game device 10. In the first embodiment, therefore, the game device 10 performs guidance on the adjustment of the position of the face of the person to be imaged in order to generate a three-dimensional face object having an expression that is not too weird. The game device 10 supports thus imaging of an accurate face image for pasting onto the three-dimensional shape model.

Figure 7:
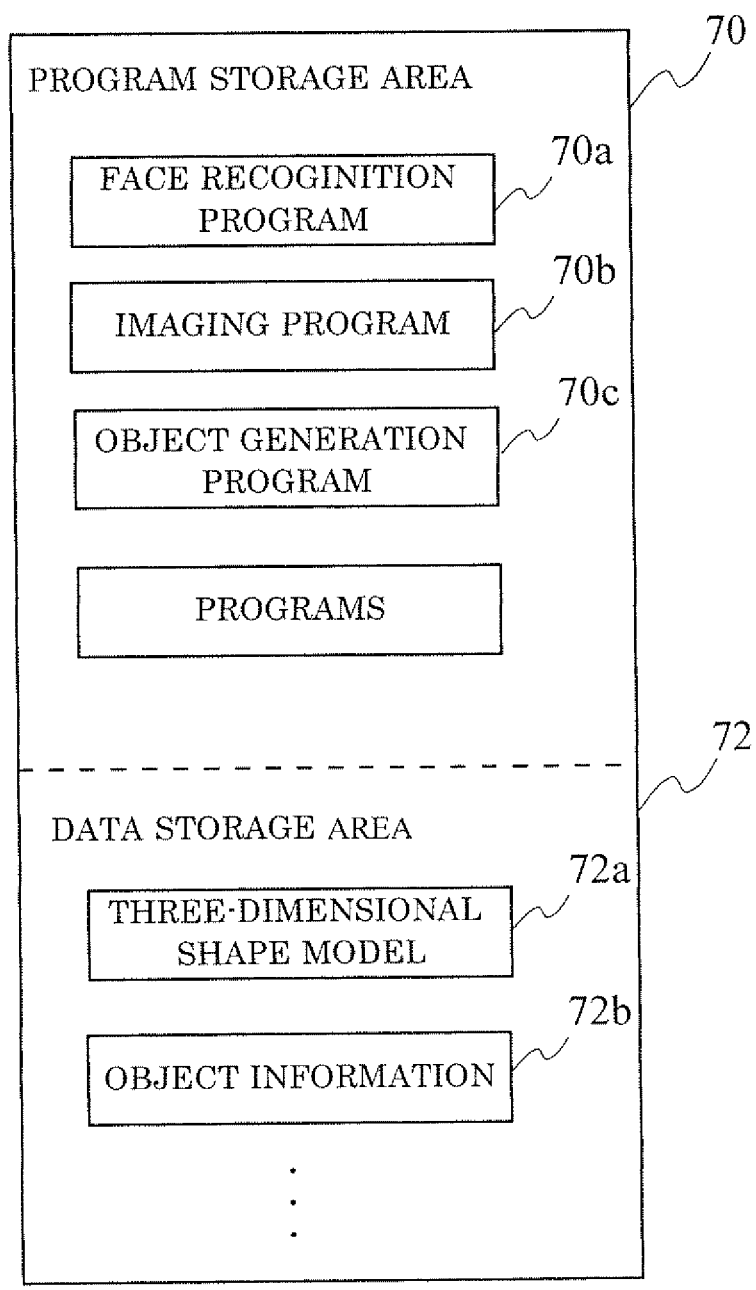
FIG. 7 is a diagram illustrating an example of a memory map of a main memory.

FIG. 7 is a diagram illustrating an example of a memory map of the main memory 32. The main memory 32 includes a program storage area 70 and a data storage area 72 in a work area. The program storage area 70 stores an application program (information processing program) such as a virtual game or the like. The information processing program has a face recognition program 70a, an imaging program 70b, a three-dimensional face object generation program 70c, and other programs.

The face recognition program 70a is a program for detecting feature points from a face image, and determining the sex and age of the person of the face image, on the basis of the detected feature points. Known software can be used in the face recognition program 70a, and hence a detailed explanation of the processing involved in the face recognition program 70a will be omitted.

Through execution of the face recognition program 70a, the information processing unit 31 performs image processing, such as edge detection, on the face image of the person to be imaged as captured by the outside imaging unit 23 or the inside imaging unit 24, at a predetermined period, and detects the positions of a plurality of feature points in the face image. In the first embodiment, the predetermined period over which feature points are detected is of 10 frames. A frame is a screen-refreshing unit time; herein one frame spans 1/60 seconds. Implementation of the present invention, however, is not limited to embodiments where the predetermined period of the feature point detection processing is 10 frames.

Figure 8:
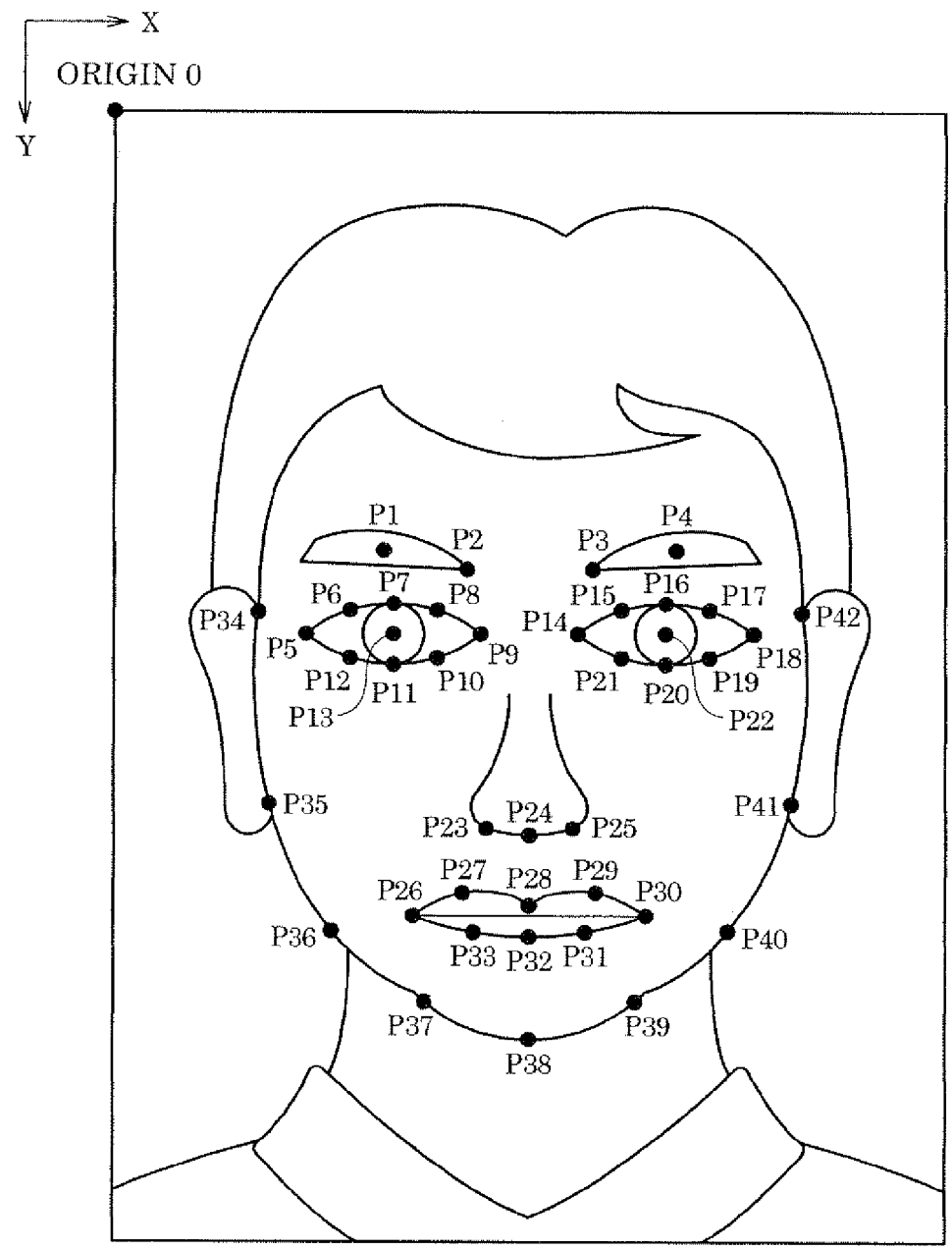
FIG. 8 is a diagram illustrating an example of feature points in a face.

FIG. 8 is a diagram illustrating an example of feature points of a face as detected through execution of the face recognition program 70a. In the first embodiment, execution of the face recognition program 70a yields 42 feature points from the face image. The feature points detected from the face image are not limited to 42 points, and may be appropriately modified in accordance with the process.

The positions of feature point P1 to feature point P42 detected by the face recognition program 70a are represented on a two-dimensional camera coordinate system. In the face image illustrated in FIG. 8, the upper left vertex of the face image is the origin O of the camera coordinate system. The rightwards direction of the face image is the positive direction in the X axis. The downwards direction of the face image is the positive direction in the Y axis. Position information of feature point P1 to feature point P42 is expressed in the form of X coordinates and Y coordinates in such a camera coordinate system. The face recognition program 70a supports also a database of data on, for instance, positional relationship characteristics of feature points for each sex and/or age, such that the sex and age of the person be imaged can be determined on the basis of, for instance, the position information of feature points P1 to P42. The age determined through execution of the face recognition program 70a is, for instance, "child", "adult" or "elderly". Age may also be detected by assigning a given age span, for instance "younger than 10", "teens", "twenties", "thirties" . . . "seventies", "eighties and older". Sex and age determination processing is more complex than feature point detection processing, and hence takes comparatively more time than feature point detection processing. The narrower the age brackets that are determined, the more complex becomes the processing, which translates into the time required by the age determination processing.

The imaging program 70b is a program for imaging of face images that are used for pasting onto the three-dimensional shape model, through guidance on the alignment of the face of the person to be imaged. The three-dimensional shape model is a model (described in detail below) in which the left and right eyes and the mouth are deformed. The game device 10 includes the outside imaging unit 23 and the inside imaging unit 24, and hence the operator of the game device 10 can capture his/her own face by using the inside imaging unit 24. The face of persons other than the operator can be imaged by using the outside imaging unit 23. Specifically, the person to be imaged may be the operator of the game device 10, or a person other than the operator. Further, the imaging target is not limited to a person, and may be an animal, provided that the face thereof is recognized by the face recognition program 70a.

In the imaging program 70b, guidance on alignment of the face of the person to be imaged includes two steps, namely (1) guidance on the adjustment of distance between the face of the person to be imaged and the outside imaging unit 23 or the inside imaging unit 24; and (2) guidance on the alignment whereby the left and right eyes and the mouth of the face of the person to be imaged are aligned with the positions of the left and right eyes and the mouth of the three-dimensional shape model.

In the above guidance (1), it is determined whether the distance between the outside imaging unit 23 or the inside imaging unit 24 and the face of the person to be imaged is appropriate, on the basis of position information of the feature points of the face image acquired by the face recognition program 70a. Herein, an appropriate distance between the face of the person to be imaged and the outside imaging unit 23 or the inside imaging unit 24 denotes a distance such that, for instance, the portion of the face in the captured image has an appropriate size for pasting onto the three-dimensional shape model. A face image having an appropriate size for pasting onto the three-dimensional shape model implies an image in which, for instance, the difference in face dimensions and in positions of the feature points between this image and the three-dimensional shape model is within an allowable predetermined error range.

Upon execution of the imaging program 70b in the first embodiment, the information processing unit 31 determines whether the distance between the face of the person to be imaged and the outside imaging unit 23 or the inside imaging unit 24 is appropriate or not on the basis of the distance between the center points of the left and right eyes from among the feature points of the face image (distance between feature point P13 and feature point P22 in FIG. 8).

For instance, the imaging program 70b includes an allowable range of the distance between center points of the left and right eyes, such that upon reading of the imaging program 70b, the allowable range of the distance between the center points of the left and right eyes is held on the main memory 32. Upon execution of the imaging program 70b in the above guidance (1), a message is displayed that urges the operator of the game device 10 to adjust the distance between the face of the person to be imaged and the outside imaging unit 23 or the inside imaging unit 24, depending on whether or not the distance between the center points of the left and right eyes of the face image is within the allowable range.

Once the above guidance (1) is over, there is performed next (2) alignment guidance wherein the left and right eyes and the mouth of the face of the person to be imaged are aligned with the left and right eyes and the mouth of the three-dimensional shape model. A target range of the positions of the left and right eyes and the mouth is displayed on the upper LCD 22 on which there is displayed the image captured by the outside imaging unit 23 or the inside imaging unit 24. The target range corresponds to the positions of the left and right eyes and the mouth of the three-dimensional shape model. The operator performs alignment of the face of the person to be imaged while looking at the target positions of the face of the person to be imaged that is projected onto the upper LCD 22 and of the left and right eyes and the mouth that correspond to the three-dimensional shape model. Alignment guidance is performed thus aimed at the operator of the game device 10.

For instance, the imaging program 70b includes respective target ranges having, as reference points, the center points of the left and right eyes and the center point of the mouth of the three-dimensional shape model, such that, upon reading of the imaging program 70b, the left and right eyes and the mouth and respective target ranges thereof are held in the main memory 32. A face image of the person to be imaged for three-dimensional shape model pasting is imaged (stored) when it is determined that the center points of the left and right eyes and the center point of the mouth of the person to be imaged are positioned within respective target ranges. The detailed processing of the imaging program 70b is explained further on.

The three-dimensional face object generation program 70c is a program for pasting a face image onto a three-dimensional shape model and for generating a three-dimensional face object of the face of the person to be imaged. The detailed processing of the three-dimensional face object generation program 70c is explained further on.

The face recognition program 70a, the imaging program 70b, and the three-dimensional face object generation program 70c are stored in the data storage internal memory 35, and are appropriately read from the main memory 32 by the information processing unit 31. The storage scheme is not limited to the above-described one, and the imaging program 70b and the three-dimensional face object generation program 70c may be recorded on an external memory 45, and may be appropriately read from the main memory 32 by the information processing unit 31. Alternatively, the imaging program 70b and the three-dimensional face object generation program 70c may be acquired by, for instance, a server or the like other than the game device 10, by way of wireless LAN, and may be appropriately read from a main memory.

A three-dimensional shape model 72a and a three-dimensional face object information 72b are stored in a data storage area 72 of the main memory 32.

The three-dimensional shape model 72a is a three-dimensional face model that is used by the three-dimensional face object generation program 70c.

Figure 9:
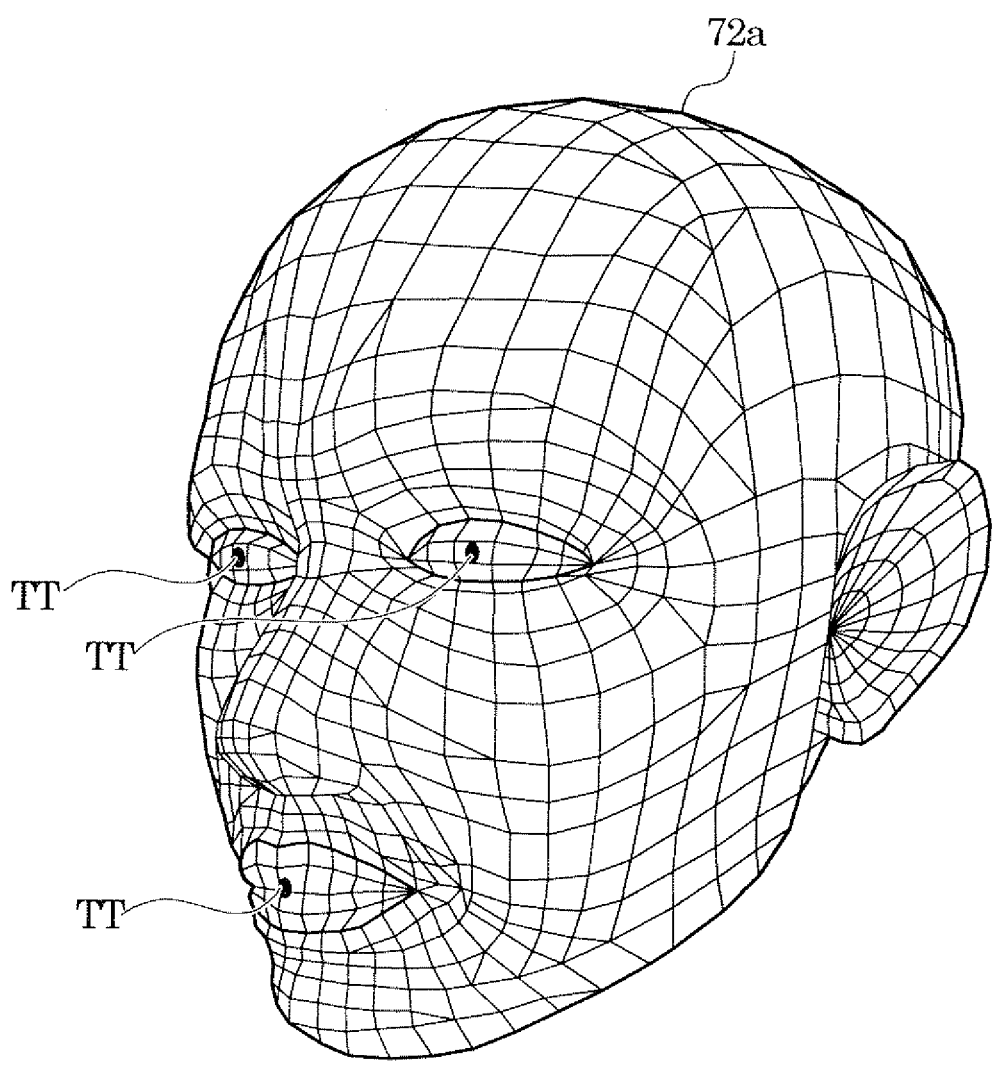
FIG. 9 is a diagram illustrating an example of a three-dimensional shape model.

FIG. 9 is a diagram illustrating an example of the three-dimensional shape model 72a. In the first embodiment, the three-dimensional shape model 72a is a three-dimensional shape model of a face defined by polygons. In a case where the three-dimensional shape model 72a is defined by polygons, the shape of the surface is determined on the basis of the three-dimensional coordinates of the vertices of the polygons. The three-dimensional shape model 72a has a plurality of control points that are used for deformation. The control points are disposed at sites that are to be deformed, for instance around the left and right eyes and around the mouth. By displacing the control points, the three-dimensional shape model 72a can modify the expression of the face through opening and closing of the eyes and/or the mouth. The three-dimensional shape model 72a allows also modifying the orientation and the like of the face.

Feature points TT are set in the three-dimensional shape model 72a. The feature points TT that can be selected include, for instance, portions having actual characteristics, such as the ends of the eyes or the mouth, the tip of the nose, the lower end of the jaw, or portions that can be easily characterized positionally even if lacking a characteristic of its own, for instance intermediate points of the foregoing. The center points of the left and right eyes and the center point of the mouth are set as the feature points TT in the three-dimensional shape model 72a illustrated in FIG. 9. The feature points TT are used as alignment reference points upon pasting of a two-dimensional face image onto the three-dimensional shape model 72a. More specifically, the feature points of the two-dimensional face image are pasted in such a way so as to match respective feature points of the three-dimensional shape model 72a.

The three-dimensional shape model 72a is not limited to a model defined by polygons, and may be a three-dimensional shape model defined by free surfaces. In a case where the three-dimensional shape model 72a is defined by free surfaces, the shape of the surfaces is decided based on the functions that define the surfaces and based on the coordinates of respective control points.

The three-dimensional shape model 72a is included in, for instance the three-dimensional face generation program 70c, such that upon reading of the three-dimensional face object generation program 70c, the three-dimensional shape model 72a becomes held in the main memory 32. Along with this, the main memory 32 holds also, for instance, the coordinates of the camera coordinate system of the center points of the left and right eyes and the center point of the mouth of the three-dimensional shape model 72a. The three-dimensional shape model 72a may also be stored in the data storage internal memory 35 of the game device 10 independently from the three-dimensional face generation program 70c.

The three-dimensional face object information 72b is information generated by the three-dimensional face object generation program 70c and relating to a three-dimensional face object in which a two-dimensional face image is pasted onto the three-dimensional shape model 72a.

Figure 10:
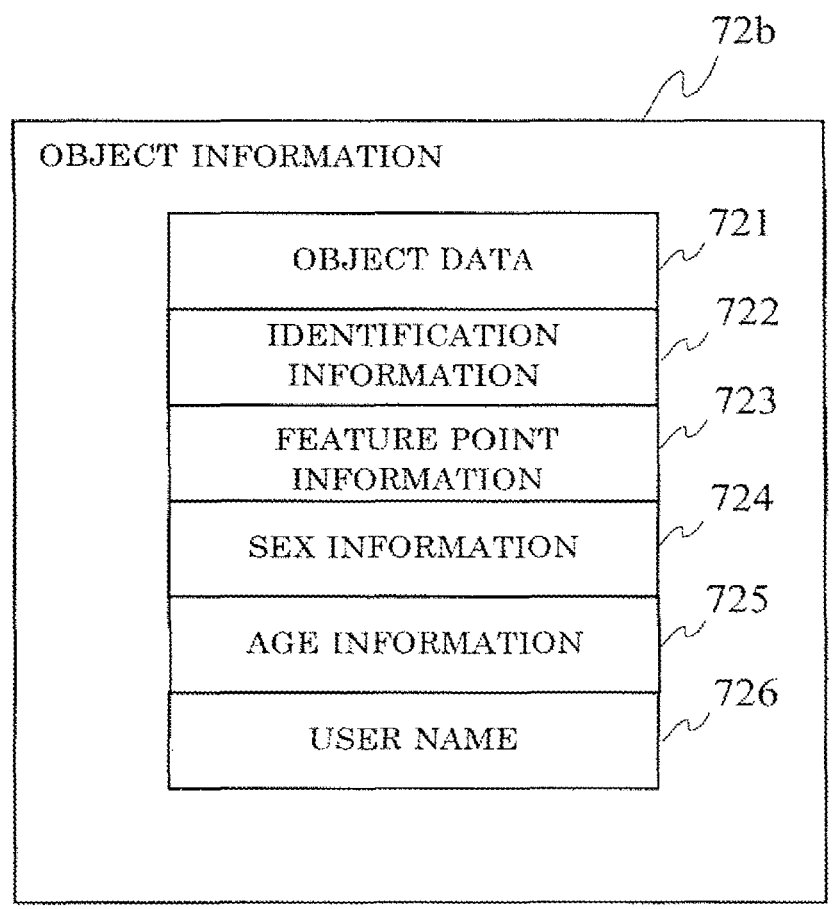
FIG. 10 is a diagram illustrating an example of three-dimensional face object information.

FIG. 10 is a diagram illustrating an example of the three-dimensional face object information 72b. The three-dimensional face object information 72b includes three-dimensional face object data 721, identification information 722, feature point information 723, sex information 724, age information 725 and a user name 726.

The three-dimensional face object data 721, which is generated by the three-dimensional face object generation program 70c, is a three-dimensional face object in which a face image is pasted onto the three-dimensional model 72a. The identification information 722 is information for enabling the game device 10 to identify internally the three-dimensional face object generated by the three-dimensional face object generation program 70c. The identification information 722 is, for instance, a combination of half-width alphanumeric characters allocated in such a manner so as not to overlap with another three-dimensional face object.

The feature point information 723 includes position information on respective feature points in a face image of the three-dimensional face object data 721 as detected by the face recognition program 70a. The sex information 724 is the sex of the face image of the three-dimensional face object data 721 as discriminated by the face recognition program 70a. The sex information 724 may be "male" or "female". The age information 725 is the age of the face image of the three-dimensional face object data 721 as determined by the face recognition program 70a. The age information 725 may be, for instance, any one from among "child", "adult", "elderly" and the like.

The user name 726 is a name given to the three-dimensional face object 721 by the operator of the game device 10. For instance, the sex information 724, the age information 725 and the user name 726 are information items that are displayed on the upper LCD 22 or the lower LCD 12 of the game device 10, as a profile of the three-dimensional face object 721.

The three-dimensional face object information 72b is stored for each three-dimensional face object generated by the three-dimensional face object generation program 70c.

OPERATION EXAMPLE

Figure 11:
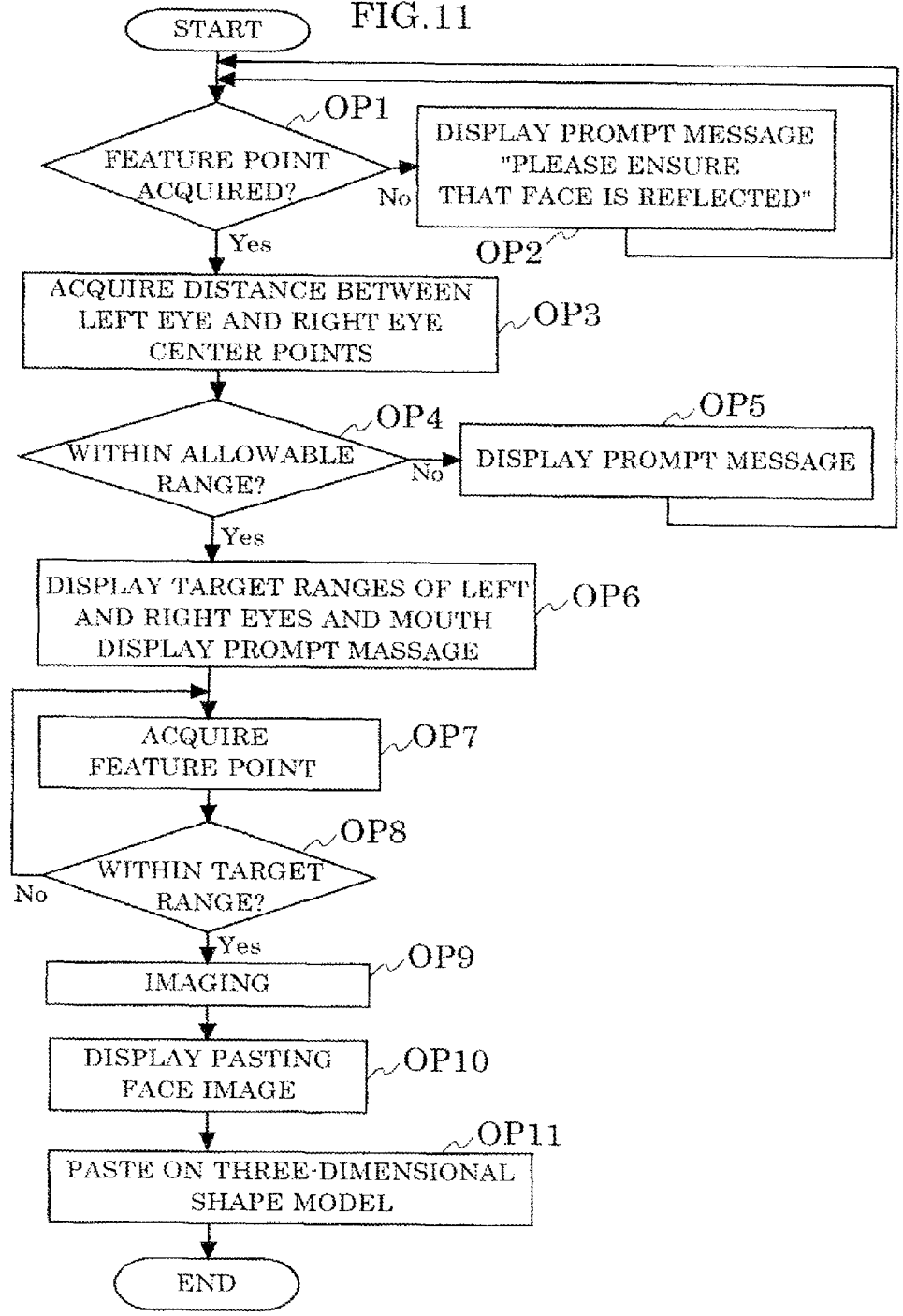
FIG. 11 is a diagram illustrating an example of process flow from guidance for imaging of face images in a game device up to generation of a three-dimensional face object.

FIG. 11 is a diagram illustrating an example of process flow from guidance for imaging of face images in the game device 10 up to generation of a three-dimensional face object. In the first embodiment, the images captured using the outside imaging unit 23 or the inside imaging unit 24 are outputted to the upper LCD 22 of the game device 10. The person to be imaged may be, for instance, the operator his/herself of the game device 10, a person other than the operator, or an image from a photograph or the like. Hereafter, the inside imaging unit 24 and the outside imaging unit 23 will be collectively referred to "imaging unit". Where the denomination "imaging unit" is used, the latter denotes the unit that is launched from among the inside imaging unit 24 and the outside imaging unit 23.

The flow illustrated in FIG. 11 starts when the operator of the game device 10 launches the imaging program 70b or an application program that uses the imaging program 70b. The face recognition program 70a is also launched upon launching of the imaging program 70b or an application program that uses the imaging program 70b. Through execution of the face recognition program 70a, the face image inputted from the imaging unit is processed, for instance over a 10-frame period, and feature points of the face image are outputted. In the embodiments of the present invention, however, the processing period of the face recognition program 70a is not limited to 10 frames. Through execution of the face recognition program 70a, there is determined the sex and age of the face image inputted from the imaging unit. Sex and age determination of the face image takes time, and hence feature points are detected first, and the sex and age determination results are outputted thereafter.

If feature points of the face image detected by the face recognition program 70a cannot be acquired (OP 1: No), the information processing unit 31 outputs a prompt message for guiding the operator so as to cause the face of the person to be imaged to appear on the screen of the upper LCD 22 (OP 2). For instance, a prompt message such as "please ensure that face is reflected" is displayed on the screen of the upper LCD 22.

If feature points of the face image detected by the face recognition program 70a are acquired (OP 1: Yes), the information processing unit 31 acquires the distance between the center points of the left and right eyes from the feature points of the face image (OP 3). For instance, the information processing unit 31 calculates and acquires the distance between the left and right center points on the basis of the coordinates of the center points of the left and right eyes.

The information processing unit 31 determines whether the distance between the center points of the left and right eyes of the face image is within an allowable range (OP 4). If the distance between the center points of the left and right eyes of the face image is within an allowable range (OP 4: Yes), the process proceeds to OP 6. If the distance between the center points of the left and right eyes of the face image is not within an allowable range (OP 4: No), a prompt message urging adjustment of the distance between the face of the person to be imaged and the imaging unit is displayed on the screen of the upper LCD 22 (OP 5).

For instance, the distance between the center points of the left and right eyes in the camera coordinate system of the three-dimensional shape model 72a is held in the data storage area 72 of the main memory 32. The allowable range of the distance between the center points of the left and right eyes of the face image is a predetermined allowable error range having, as a reference value, the distance between the center points of the left and right eyes in the camera coordinate system of the three-dimensional shape-model 72a. That is, the allowable range of the distance between the center points of the left and right eyes of the face image is reference value±error α. However, the allowable range of the distance between the centers of the left and right eyes of the face image is not limited thereto.

In the determination processing of OP 4, the information processing unit 31 determines whether the distance between the center points of the left and right eyes of the face image is smaller than a minimum value (reference value−error α) of the allowable range, and determines next whether the distance between the center points of the left and right eyes of the face image is greater than a maximum value (reference value+error α) of the allowable range. The specific procedure is as follows.

The information processing unit 31 determines whether the distance between the center points of the left and right eyes of the face image acquired in OP 3 is smaller than a minimum value (reference value−error α) of the allowable range. If the distance between the center points of the left and right eyes of the face image is smaller than a minimum value (reference value−error α) of the allowable range (OP 4: No), this indicates that the distance between the face of the person to be imaged and the imaging unit is excessive, and hence the information processing device 31 displays on the screen of the upper LCD 22 a guidance message for shortening of the distance between the face of the person to be imaged and the imaging unit (OP 5). The guidance message for shortening of the distance between the face of the person to be imaged and the imaging unit may be, for instance, "please move your face closer". Thereafter, the process returns to OP 1. The prompt message is displayed on the screen of the upper LCD 22 together with the images that are displayed on the screen of the upper LCD 22 as sequentially imaged by the imaging unit. However, display is not limited thereto, and for instance the prompt message alone may be displayed on the screen of the upper LCD 22, so that, after a predetermined lapse of time, the images captured by the imaging unit may be displayed on the screen of the upper LCD 22.

Figure 12:
FIG. 12 is an example of a display screen of a prompt message in a case where the face of a person to be imaged is too far away from an outside imaging unit or inside imaging unit.

FIG. 12 is an example of a display screen of a prompt message in a case where the face of the person to be imaged is too far away from the imaging unit. In the example illustrated in FIG. 12, the distance between the left and right eyes of the face image of the person to be imaged is smaller than the allowable range, and hence a prompt message such as "please move your face closer" is displayed. In the example illustrated in FIG. 12, the prompt message is displayed on the screen of the upper LCD 22 together with the images that are sequentially captured by the imaging unit.

If the distance between the center points of the left and right eyes of the face image is not smaller than a minimum value (reference value−error α) of the allowable range, the information processing unit 31 determines whether the distance between the center points of the left and right eyes of the face image is greater than a maximum value (reference value+error α) of the allowable range. If the distance between the center points of the left and right eyes the face image is greater than a maximum value (reference value+error α) of the allowable range (OP 4: No), this indicates that the distance between the face of the person to be imaged and the imaging unit is too short, and hence the information processing device 31 displays on the screen of the upper LCD 22 a guidance message for lengthening of the distance between the face of the person to be imaged and the imaging unit (OP 5). The guidance message for lengthening of the distance between the face of the person to be imaged and the imaging unit may be, for instance, "please move your face away". Thereafter, the process returns to OP 1.

If the distance between the center points of the left and right eyes of the face image is not smaller than a minimum value (reference value−error α) of the allowable range and is not greater than a maximum value (reference value+error α) of the allowable range, this indicates that the distance between the center points of the left and right eyes of the face image is within an allowable range (OP 4: Yes), and the process proceeds to OP 6.

Figure 13:
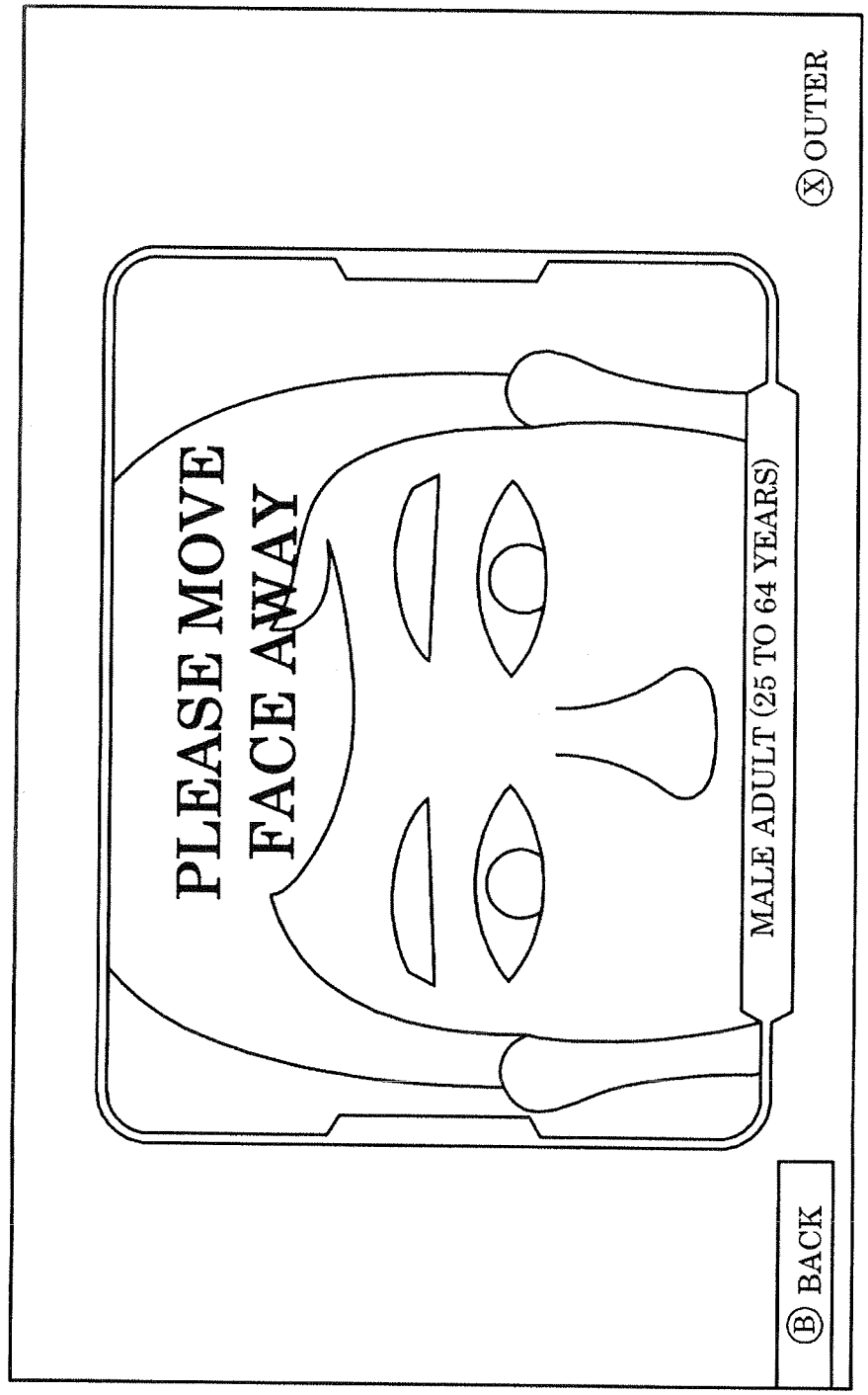
FIG. 13 is an example of a display screen of a prompt message in a case where the face of the person to be imaged is too close to an outside imaging unit or inside imaging unit.

FIG. 13 is an example of a display screen of a prompt message in a case where the face of the person to be imaged is too close to the imaging unit. In the example illustrated in FIG. 13, the distance between the left and right eyes of the face image of the person to be imaged is greater than the allowable range, and hence a prompt message such as "please move your face away" is displayed. In the example illustrated in FIG. 13, the prompt message is displayed on the screen of the upper LCD 22 together with the images that are sequentially captured by the imaging unit. At this stage there is guidance only for adjustment of the distance between the person to be imaged and the imaging unit. Accordingly, the information processing unit 31 performs the determination of OP 4, provided that the distance between the center points of the left and right eyes can be acquired, even if the face of the person to be imaged is at a position removed from the center of the screen, as illustrated in FIG. 13. A prompt message can be thus displayed.

The determination processing executed in OP 4 is not limited to the above-described processing. The order of the determination is not limited to the above-described one; i.e. it may be determined whether the distance between the center points of the left and right eyes of the face image is greater than a maximum value (reference value+error α) of the allowable range, and, thereafter, it may be determined whether the distance between the center points of the left and right eyes of the face image is smaller than a minimum value (reference value−error α) of the allowable range.

In the determination processing executed in OP 4, it may be determined whether the distance between the center points of the left and right eyes of the face image is equal to or greater than a minimum value and equal to or smaller than a maximum value of the allowable range, such that if the distance is equal to or greater than the minimum value and equal to or smaller than the maximum value, the process proceeds to OP 6. If the distance between the center points of the left and right eyes of the face image is not equal to or greater than a minimum value and equal to or smaller than a maximum value of the allowable range, it may be determined next whether the distance between the center points of the left and right eyes of the face image is smaller than a minimum value of the allowable range, and there is displayed a prompt message according to the determination result. Instead of determining whether the distance between the center points of the left and right eyes of the face image is smaller than a minimum value of the allowable range, there may be determined whether the distance between the center points of the left and right eyes of the face image is greater than a maximum value of the allowable range. There is no limitation as to the determinations that are carried out.

In OP 4, the feature of lying within the allowable range is not limited, and may denote being equal to or greater than a minimum value but smaller than a maximum value of the allowable range, being equal to or greater than a minimum value and equal to or smaller than a maximum value, being greater than a minimum value and equal to or smaller than a maximum value, or being greater than a minimum value but smaller than a maximum value.

If the distance between the center points of the left and right eyes of the face image is determined to be within the allowable range (OP 4: Yes), this indicates that the adjustment of the distance between the face of the person be imaged and the imaging unit is complete. Next, in order to guide adjustment of the positions of the left and right eyes and the mouth of the person to be imaged, the information processing unit 31 displays a target range of the left and right eyes and the mouth, as well as a prompt message, on the upper LCD 22 (OP 6). The target range of the left and right eyes and the mouth and the prompt message are displayed on the screen of the upper LCD 22 together with a new image that is periodically captured and updated by the imaging unit (for instance, at periods of 1/60 seconds), such that the new image allows checking the state of the face of the person to be imaged substantially in real time. However, display is not limited thereto, and for instance the prompt message alone may be displayed on the screen of the upper LCD 22, and, after a predetermined lapse of time, an image captured by the imaging unit and the target ranges of the left and right eyes and the mouth are displayed on the screen of the upper LCD 22. The operator of the game device 10 can perform alignment smoothly, while checking the position of the face of the person to be imaged, through display, on the screen of the upper LCD 22, of the target positions of the left and right eyes and the mouth together with the images displayed on the screen of the upper LCD 22 as sequentially captured by the imaging unit.

The target ranges of the left and right eyes and the mouth of the face image are defined, for instance, as reference points in the form of the coordinates of the center points of the left and right eyes and the center point of the mouth in the three-dimensional shape model 72a converted to a camera coordinate system. The position information of the center points of the left and right eyes and the center point of the mouth in the three-dimensional shape model 72a is stored, for instance, in the form of respective coordinates converted to the camera coordinate system (FIG. 8). The target ranges, for instance, are defined as a $\pm\beta$ range in the X axis direction and a $\pm\gamma$ range in the Y axis direction, from a reference point. The target ranges may be defined as a range of distance $\sigma$ from a reference point. The embodiments of the present invention are not limited to any given definition.

Figure 14:
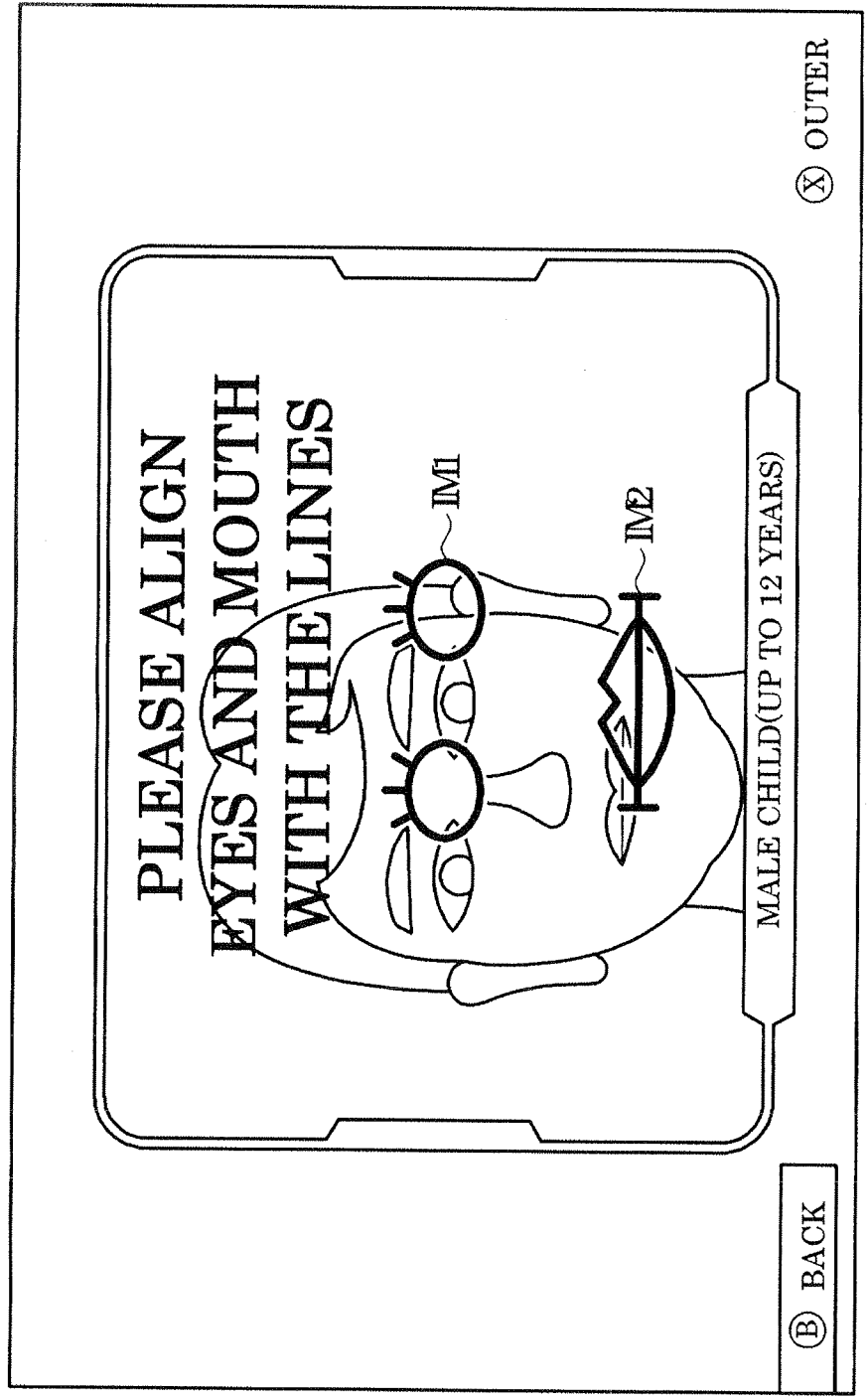
FIG. 14 is a diagram illustrating an example of screen display with a prompt message and target range for guidance of the adjustment of the positions of the left and right eyes and the mouth of a person to be imaged.

FIG. 14 is a diagram illustrating an example of screen display with a prompt message and a target range for guidance of the adjustment of the positions of the left and right eyes and the mouth of the person to be imaged. In the example illustrated in FIG. 14, the target ranges of the left and right eyes and the mouth are displayed in the form of an image IM 1 of the left and right eyes and an image IM 2 of the mouth. A prompt message such as "please align eyes and mouth with the lines" is displayed for guiding alignment of the image IM 1 of the left and right eyes and the image IM 2 the mouth. The size (dimensions) of the image IM 1 of the left and right eyes and the image IM 2 of the mouth need not match exactly the respective target ranges. The target ranges of the left and right eyes and the mouth are not limited to being displayed in the form of images. Herein, display can adopt various forms, for instance display of the center points of the left and right eyes and the center point of the mouth in the three-dimensional shape model 72a, or display of circles. Also, the prompt message can be modified in accordance with the form in which the target positions are displayed.

In a case where, in OP 6, determination of the sex and age of the face image of the face recognition program 70a is over upon display of the prompt message, the information processing unit 31 may output the determination result of the sex and age of the face image together with the target positions of the left and right eyes and the mouth. In FIG. 14, the determination result for the sex of the person to be imaged is "male" and the age determination result is "child". These results are disposed at the lower portion of the screen. By the stage of OP 6, the face of the person to be imaged is not always at an appropriate position, and hence sex and age determination is not final.

In OP 6, after display of the prompt message and the target ranges of the left and right eyes and the mouth, the information processing unit 31 acquires the feature points of the face image as detected anew through execution of the face recognition program 70a (OP 7). The information processing unit 31 determines whether the center points of the left and right eyes and the center point of the mouth of the face image newly acquired are all within the target ranges (OP 8).

In a case where, for instance, the target ranges are defined as a $\pm\beta$ range in the X axis direction and a $\pm\gamma$ range in the Y axis direction, from a reference point, the information processing unit 31 determines whether the center points of the left and right eyes and the center point of the mouth of the face image are within a respective target range by determining whether the respective coordinates of the center points of the left and right eyes and the center point of the mouth of the face image are within respective target ranges.

In a case where, for instance, the target ranges are defined as ranges within a distance $\sigma$ from a reference point, the information processing unit 31 measures the respective distances, from a reference point, for the center points of the left and right eyes and the center point of the mouth of the face image, and determines whether the center points of the left and right eyes and the center point of the mouth of the face image are within respective target ranges by determining whether the measured distances are equal to or smaller than the distance $\sigma$.

In all cases, the target ranges of the left and right eyes and the mouth of the face image are set to be narrower (strict condition) than the allowable range (reference value±error $\alpha$) of the distance between the center points of the left and right eyes of the face image. That is because the position of the face image is firstly adjusted roughly through adjustment of the distance between the face of the person to be imaged, and next there is performed a fine adjustment of aligning the left and right eyes and the mouth of the face image to target positions. In the game device 10, guidance on rough adjustment of the face of the person to be imaged is performed first through the comparatively simple process of determining the distance between the center points of the left and right eyes, and guidance on a comparatively complex fine adjustment, namely alignment of the left and right eyes and the mouth, is performed next. The operator can be guided smoothly thereby.

If none of the center points of the left and right eyes and the center point of the mouth of the face image is within a respective target range (OP 8: No), the information processing unit 31 waits until subsequent feature points of the face image are detected through execution of the face recognition program 70a, and the processes of OP 7 and OP 8 are repeated. The prompt message and the target ranges of the left and right eyes and the mouth remain displayed on the screen of the upper LCD 22 display.

If both the center points of the left and right eyes and the center point of the mouth of the face image are within a respective target range (OP 8: Yes), the information processing unit 31 automatically releases the shutter of the imaging unit and captures an image (OP 9). Specifically, after the information processing unit 31 has determined that the center points of the left and right eyes and the center point of the mouth of the face image are both within respective target ranges, the face image captured by the imaging unit is stored in a work area of the main memory 32 as a pasting face image on the three-dimensional shape model 72a. The operation is not limited to the above, and imaging of the pasting face image may be carried out through release of the shutter as a result of operation of a button by the operator of the game device 10.

Figure 15:
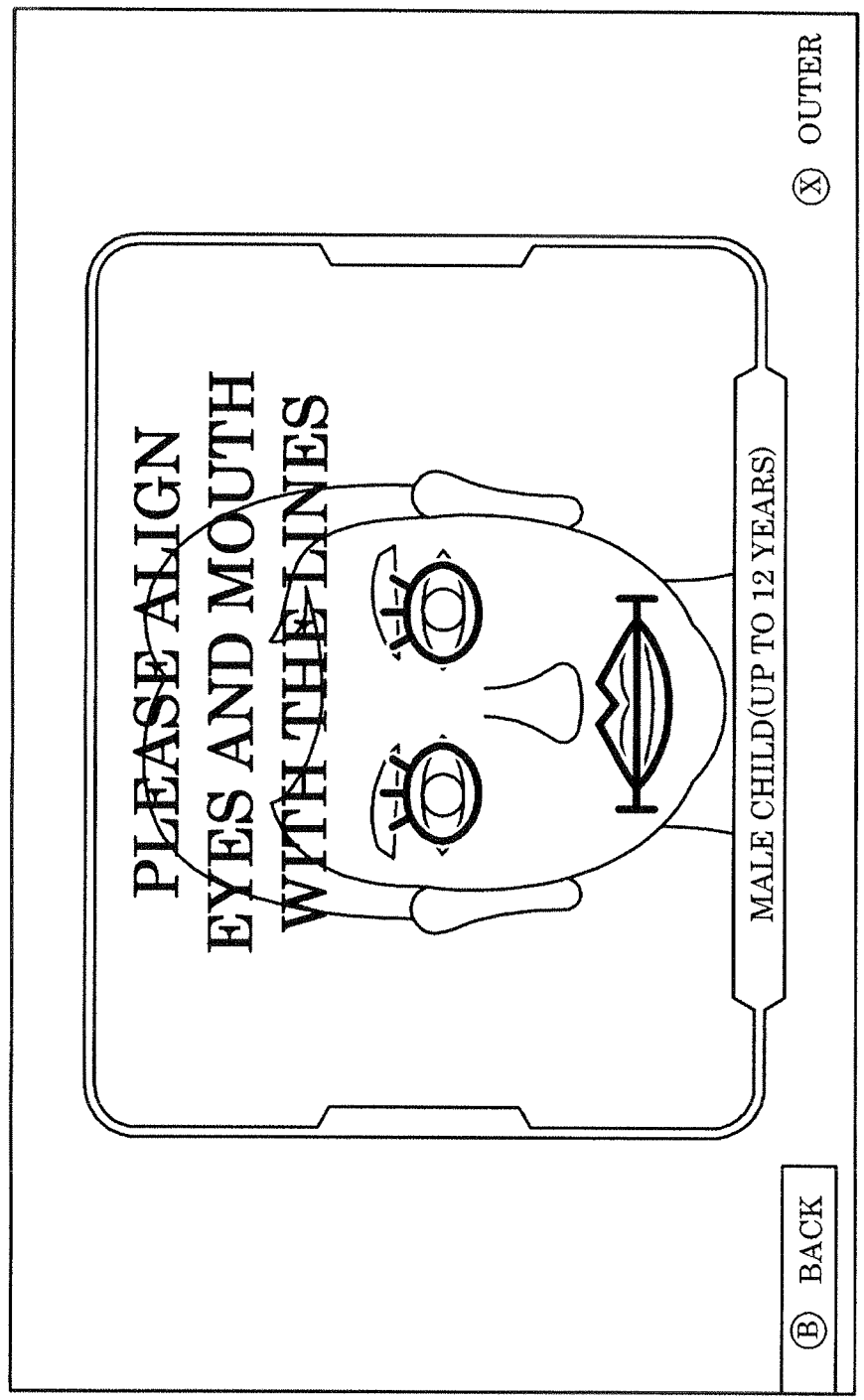
FIG. 15 is a diagram illustrating an example of a display screen at a time when the center points of the left and right eyes and the center point of the mouth of a person to be imaged are within a target position.

FIG. 15 is a diagram illustrating an example of a display screen at a time when the center points of the left and right eyes and the center point of the mouth of a person to be imaged are within a target position. In a state such as the one illustrated in FIG. 15, the information processing unit 31 determines that the center points of the left and right eyes and the center point of the mouth of the face image are within respective target ranges, and imaging is performed automatically through release of the shutter of the imaging unit. The sex and age determination result of the face image are also displayed in FIG. 15, in the same way as in FIG. 14.

The information processing unit 31 displays, on the screen of the upper LCD 22, the captured pasting face image, and urges confirmation by the operator of the game device 10. At this time, the information processing unit 31 displays, as final results, the sex and age determination result of the face image as determined by the face recognition program 70a (OP 10).

Figure 16:
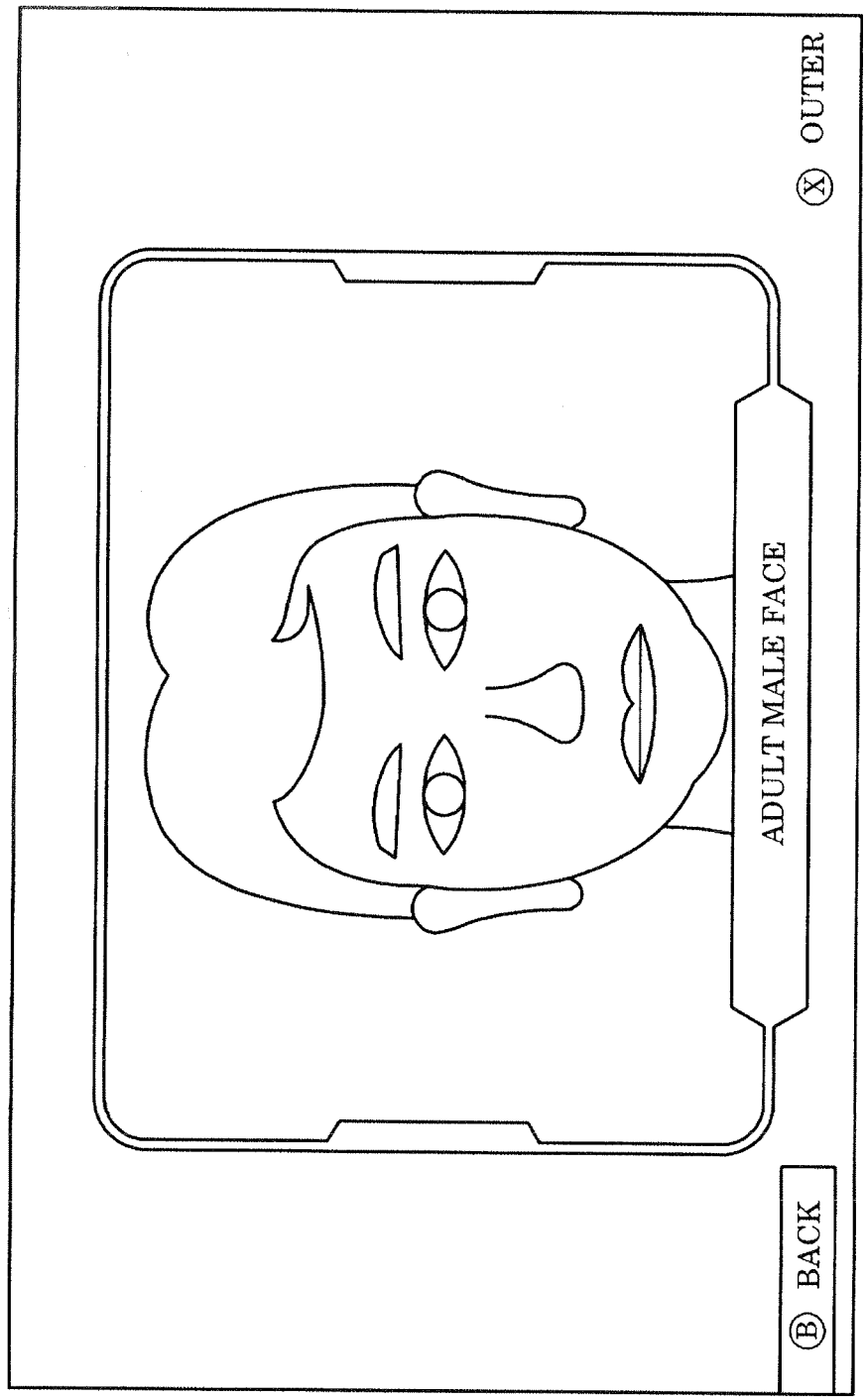
FIG. 16 is a diagram illustrating an example of a display screen of a captured face image, for pasting.

FIG. 16 is a diagram illustrating an example of a display screen of a captured face image, for pasting. The final results of the sex and age determination of the face image are also displayed along with the pasting face image. In the example illustrated in FIG. 16, "male adult face" is displayed as the final result of the sex and age determination. Determination results such as "female child face" or "male elderly face" are displayed as determination results for other sexes and ages.

Upon confirmation of the pasting face image through an operation by the operator of the game device 10, the information processing unit 31 launches the three-dimensional face object generation program 70c, and pastes the pasting face image to the three-dimensional shape model 72a, to generate a three-dimensional face object (OP 11). The information processing unit 31 stores the generated three-dimensional face object in the data storage area 72 in a work area of the main memory 32. Alongside the three-dimensional face object, the information processing unit 31 stores also the feature points of the face image, the sex and age determination results and so forth as the three-dimensional face object information 72b. The three-dimensional face object information stored in the main memory 32 is recorded in the data storage internal memory 35 or data storage external memory 46, through an operation by the operator of the game device 10 or through a power-off sequence of the game device 10.

Figure 17:
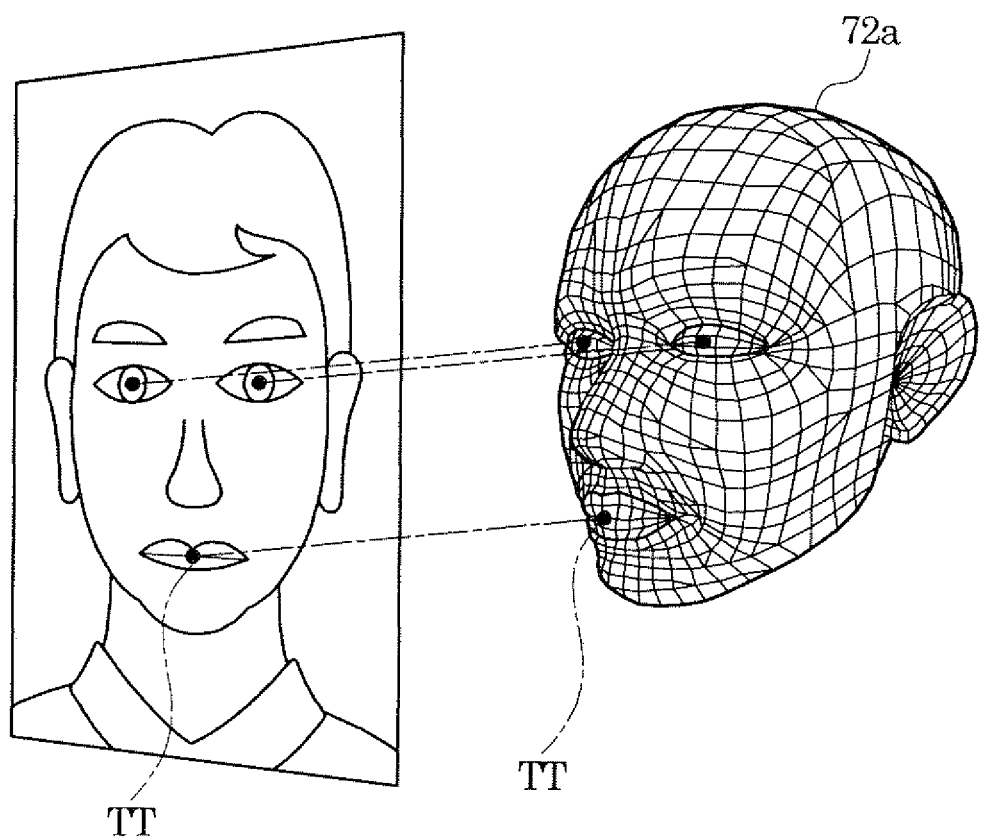
FIG. 17 is a diagram illustrating an example of alignment upon pasting of a pasting face image to a three-dimensional shape model.

FIG. 17 is a diagram illustrating an example of alignment between a two-dimensional face image and the three-dimensional shape model 72a upon pasting of a pasting face image onto the three-dimensional shape model 72a. Through execution of the three-dimensional face object generation program 70c, the information processing unit 31 maps the center points of the left and right eyes and the center point of the mouth of the pasting image to the center points of the left and right eyes and the center point of the mouth of the three-dimensional shape model 72a, and modifies the positions, orientation and so forth in the three-dimensional shape model 72a in such a way so as minimize the distances between the foregoing center points. For instance, an energy function or the like may be used for alignment. For instance, there may be minimized the sum of the squares of distances ($D1^2+D2^2+D3^2$) between the pasting image and the three-dimensional shape model 72a, wherein distance D1 denotes the distance between the left eye center points, the distance D2 denotes the distance between right eye center points, and distance D3 denotes the distance between the mouth center points.

The pasting face image is captured, in OP 9 in the flow of FIG. 11, through face position adjustment under the strict condition that mandates matching of the center points of the left and right eyes and the mouth with the three-dimensional shape model 72a. Therefore, alignment with the three-dimensional shape model 72a can be performed with good precision.

<Example of Usage of a Three-Dimensional Face Object>

Figure 18:
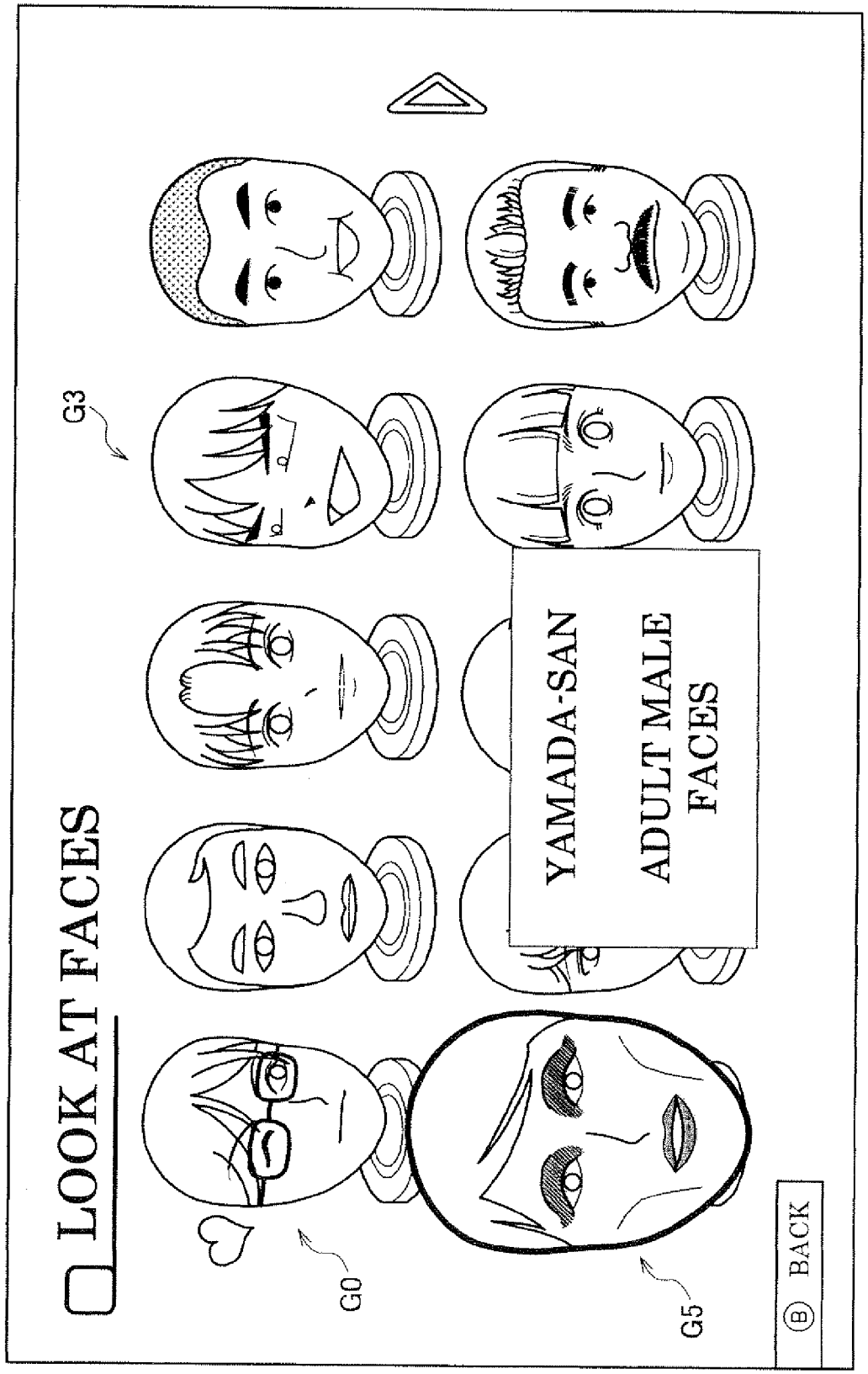
FIG. 18 is a diagram illustrating a Use example 1 of a three-dimensional face object.

FIG. 18 is a diagram illustrating a Use example 1 of a three-dimensional face object. FIG. 18 is a diagram illustrating an example of a list screen of a three-dimensional face object stored in the game device 10. The three-dimensional face objects are operated by an application program. In the example illustrated in FIG. 18, a three-dimensional face object G0 is winking by closing the right eye. A three-dimensional face object G3 is turning the face towards a three-dimensional object G5. Information in the three-dimensional face object information 72b on the three-dimensional face object G5 is displayed upon selection, for instance, of the three-dimensional face object G5 through an operation by the operator. For instance, there are displayed the user name ("Yamada-san" in FIG. 18) of the three-dimensional face object G5, as well as the sex, age and so forth (in FIG. 18, "male adult face").

For all the three-dimensional face objects illustrated in FIG. 18, the pasting face image is captured in such a manner that the center points of the left and right eyes and the mouth of the three-dimensional shape model 72a match the center points of the left and right eyes and the mouth of the face image. A natural expression having little weirdness can be brought out thereby. For instance, a closed-eye expression can be displayed by moving the control points around an eye in the three-dimensional shape model 72. In this case, the center point of the eye in the three-dimensional shape model 72 and the center point of the eye in the face image fit each other, and hence the closed-eye expression can be displayed accurately.

Figure 19:
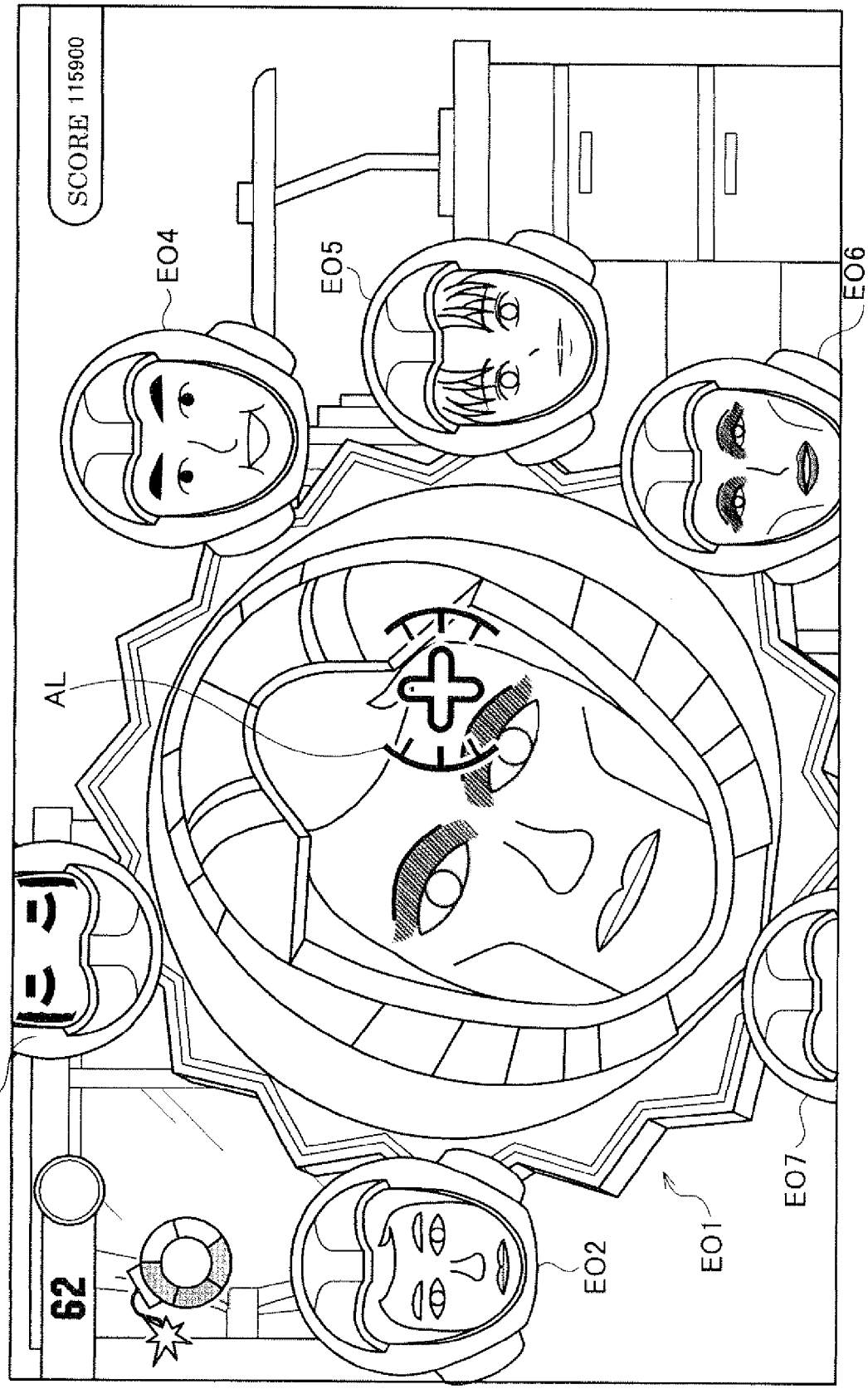
FIG. 19 is a diagram illustrating a Use example 2 of a three-dimensional face object.

FIG. 19 is a diagram illustrating a Use example 2 of a three-dimensional face object. FIG. 19 is a diagram illustrating an example of a screen displayed during execution of an application program of a game. The three-dimensional face object, for instance, is used as an enemy character of a three-dimensional object in a game, through combination of a character frame, in a game that involves destroying a three-dimensional object enemy that breaks through out of a rear side of the real world (virtual space) that is projected onto the screen of the upper LCD 22 of the game device 10, into the real world. For instance, the user may select a three-dimensional face object of an enemy character by using the list screen of three-dimensional face objects displayed in FIG. 18. In FIG. 19, some of the three-dimensional face objects of the example illustrated in FIG. 18 are used as enemy characters E01 to E07. Such enemy characters of three-dimensional objects utilize the three-dimensional shape model 72a, so that the expression and orientation or characters can change.

<Effect of the First Embodiment>

In order to capture a face image that is pasted to a three-dimensional shape model 72a in which the left and right eyes and the mouth are deformed, the game device 10 performs (1) guidance on adjustment of the distance between the face of the person to be imaged and the imaging unit, and performs (2) guidance on adjustment of the positions of the left and right eyes and the mouth in the face image of the person to be imaged. Through the above guidance (1) there is adjusted, to some extent, the position of the left and right eyes, and through the above guidance (2) the operator of the game device 10 can be guided through display of a target position for alignment of the left and right eyes and the mouth. As a result, the operator of the game device 10 can align the left and right eyes and the mouth of the person to be imaged more easily than in a case where the positions of the left and right eyes and the mouth are adjusted all at once. Processing in the game device 10 is less complex than when the positions of the left and right eyes and the mouth are adjusted all at once, and hence the load placed on the game device 10 can be eased. Also, there can be enhanced the accuracy of the arrangement of the left and right eyes and the mouth of the person to be imaged with respect to the target positions of the left and right eyes and the mouth in the image. The captured face image is thus imaged under the strict conditions of conforming to the three-dimensional shape model 72a. This allows increasing the precision of alignment with the three-dimensional shape model 72a. An object can be generated as a result having the face of the person to be imaged that is imbued with a natural expression that has no weirdness.

The face image of the person to be imaged is captured so as to conform to the three-dimensional shape model 72a. Therefore, the game device 10 can generate a plurality of three-dimensional face objects of changing expression using one model, without creating a model out of a captured face image and without preparing a plurality of three-dimensional shape models.

The game device 10 goes through the above steps (1) and (2) in order to capture a face image for three-dimensional face objects, and hence imaging is not possible without the consent of the person to be imaged. This has the effect of preventing covert image capture.

The game device 10 determines the sex and age of the person to be imaged through execution of the face recognition program 70a. However, sex and age determination takes longer than feature point detection in a face image. The operator of the game device 10 performs position adjustment according to the guidance for face position adjustment, such as those in (1) and (2) above, during the sex and age determination processing by the face recognition program 70a. Therefore, this allows easing the annoyance to the operator on account of the wait time until the results of the sex and age determination of the person to be imaged are outputted.

<Variation>

In the first embodiment, guidance for adjustment of the distance between the face of the person to be imaged and the imaging unit according to (1) above is performed on the basis of the distance between the center points of the left and right eyes of the face image. Alternatively, the game device 10 may perform guidance for adjustment of the distance between face of the person to be imaged and the outside imaging unit 23 or the inside imaging unit 24, on the basis of the surface area of a triangle that is formed by the center points of the left and right eyes and the center point of the mouth of the face image. In this case, the game device 10 holds beforehand an allowable range of the surface area of such a triangle, the information processing unit 31 works out the surface area of the triangle on the basis of position information of the center points of the left and right eyes and the center point of the mouth of the face image, and determines whether the surface area is within the allowable range. If the surface area is smaller than a minimum value of the allowable range, the information processing unit 31 displays a prompt message for urging the operator to bring the face of the person to be imaged closer to the imaging unit. If the surface area is greater than the maximum value of the allowable range, the information processing unit 31 displays a prompt message for urging the operator to move the face of the person to be imaged away from the imaging unit. The prompt message is not limited to a message displayed on the screen of the upper LCD 22 or the lower LCD 12, and may be outputted as a voice message.

Guidance for adjustment of the distance between the face of the person to be imaged and the imaging unit according to (1) above is not limited to being performed on the basis of the distance between the center points of the left and right eyes of the face image and of the surface area of a triangle formed by the center points of the left and right eyes and the center point of the mouth of the face image, and may be performed on the basis of the distance between two feature points of the face image. Once guidance for adjustment of the distance between the face of the person to be imaged and the imaging unit is over, there may be displayed the target positions of the above two feature points and of one feature point other than these two feature points. Firstly, the positional relationship between the imaging device and the face of the person to be imaged is adjusted to some extent using two feature points; thereupon, the operator of the information processing device or of the imaging device can be guided through display of a target position for matching the positions of the two feature points and another one feature point. As a result, the operator can perform alignment of the three feature points more easily than when adjusting the position of three feature points all at once. The distance between two feature points in a face varies depending on the person. However, the face image is captured in such a manner that the distance between two feature points is the distance between the two feature points in the three-dimensional shape model 72a, and hence the two feature points can be matched to the three-dimensional shape model 72a for any given person. Likewise, the positional relationship between the two feature points and the other one feature point varies depending on the person. However, the other one feature point can be matched to the model, while in a state where the two feature points are matched to the three-dimensional shape model 72a, for instance through tilting of the imaging unit. As a result, this allows imaging a face image that is pasted on the three-dimensional shape model 72a, and allows generating a three-dimensional face object of the person to be imaged, regardless of who the person to be imaged is.

In the above guidance (1) in the first embodiment, a prompt message is displayed, and guidance for adjustment of the distance between the face of the person to be imaged and the imaging unit is performed, in a case where the distance between the center points of the left and right eyes of the face image is not within an allowable range. The game device 10 may display target ranges of the left and right eyes and the mouth of the face image, in the guidance (2) above, when the distance between the center points of the left and right eyes of the face image is within the allowable range, without displaying a prompt message for guidance on adjustment of the distance between the face of the person to be imaged and the imaging unit, as in a case where the distance between the center points of the left and right eyes of the face image is not within an allowable range.

In the first embodiment there are displayed target ranges having, as reference points, respective center points of the left and right eyes and the mouth of the three-dimensional shape model 72a. However, the first embodiment is not limited thereto, and for instance the game device 10 may display target ranges having, as reference points, the center of the left and right eyes and the tip of the nose, so that the operator is guided to cause the left and right eyes and nose of the person to be imaged to be within a target range. That is, a site displayed as a target range need only be a range such that any of the feature points of the face is used as reference. The game device 10 may display the outline of the three-dimensional shape model 72a, such the operator is guided to match the outline of the face of the person to be imaged to the outline of the three-dimensional shape model 72a.

<Others>

The series of processes in the face recognition program 70a, the imaging program 70b and the three-dimensional face object generation program 70c as explained above for the first embodiment are not limited to the game device 10. For instance, the processes can be used in an imaging device such as a camera-equipped cell phone or a digital camera, and in a device that is provided with a image device and a display device that displays images captured by such the imaging device. Guidance processing for alignment of the face of the person to be imaged can be used in a personal computer that is connected to, or can communicate with, an imaging device and a display device.

The face recognition program 70a, the imaging program 70b and the three-dimensional face object generation program 70c of the first embodiment can be held in a server on a network such as the Internet. For instance, a face image captured by a user terminal such as a camera-equipped cell phone, a camera-equipped information processing terminal, a camera-equipped personal computer or the like is transmitted to such a server on a network. The server may execute the face recognition program 70a, the imaging program 70b and the three-dimensional face object generation program 70c to analyze thereby the transmitted face image (determination of the distance between the center points of the left and right eyes and positions of the left and right eyes and the mouth), and may transmit the analysis results in the form of, for instance, prompt messages and target ranges of the left and right eyes and the mouth, as a reply to the user terminal. If the left and right eyes and the mouth of the face image transmitted by the user terminal are within respective target ranges, the server may paste the face image onto the three-dimensional shape model 72a, generate a three-dimensional face object, and transmit the latter to the user terminal. Alternatively, the server may use the generated three-dimensional face object as a character in a game that is provided via the Internet.

What is claimed is:

1. A non-transitory storage medium recording an information processing program that is executed in an information processing device that acquires a face image of a person to be imaged that is captured by an imaging device,
    wherein the information processing program causes the information processing device to execute:
    determining whether a distance between a face of the person to be imaged and the imaging device is within a finite, non-zero predetermined range; and
    if the distance between the face of the person to be imaged and the imaging device is determined to be within said predetermined range, displaying, on a display device, a target position for alignment of at least one feature point contained in the face image of the person to be imaged, together with the face image of the person to be imaged repeatedly captured by the imaging device, and if the distance between the face of the person to be imaged and the imaging device is determined to be outside said predetermined range, not displaying, on the display device, a target position for alignment of at least one feature point contained in the face image of the person to be imaged, together with the face image of the person to be imaged repeatedly captured by the imaging device.

2. The non-transitory storage medium recording an information processing program according to claim 1,
    wherein, the determination is performed on the basis of the face image of the person to be imaged that is captured by the imaging device.

3. The non-transitory storage medium recording an information processing program according to claim 2,
    wherein, the determination is performed on the basis of a distance between two feature points in the face image of the person to be imaged that is captured by the imaging device.

4. The non-transitory storage medium recording an information processing program according to claim 3,
    wherein in the displaying, there is displayed target positions for alignment of the two feature points used in the determining and another feature point that is not used in the determining.

5. The non-transitory storage medium recording an information processing program according to claim 1,
    wherein in the determining, whether the distance between the face of the person to be imaged and the imaging device is within the predetermined range is determined by determining whether a distance between center points of left and right eyes acquired from the face image of the person to be imaged as captured by the imaging device is within a predetermined error range with respect to a predetermined reference value.

6. The non-transitory storage medium recording an information processing program according to claim 5, wherein the information processing program further causes the information processing device to execute:
    guidance for, when the distance between the face of the person to be imaged and the imaging device is determined not to be within the predetermined range, outputting a prompting for adjustment of the distance.

7. The non-transitory storage medium recording an information processing program according to claim 6,
    wherein in the guidance, if the distance between the center points of the left and right eyes is smaller than a minimum value of the predetermined error range with respect to the predetermined reference value, a message urging shortening of the distance between the face of the person to be imaged and the imaging device is displayed on the display device.

8. The non-transitory storage medium recording an information processing program according to claim 6,
    wherein in the guidance, if the distance between the center points of the left and right eyes is greater than a maximum value of the predetermined error range with respect to the predetermined reference value, a message urging lengthening of the distance between the face of the person to be imaged and the imaging device is displayed on the display device.

9. The non-transitory storage medium recording an information processing program according to claim 1,
    wherein in the determining, whether the distance between the face of the person to be imaged and the imaging device is within the predetermined range is determined by determining whether an area of a triangle that joins center points of left and right eyes and a center point of a mouth acquired from the face image of the person to be imaged as captured by the imaging device is within a predetermined error range with respect to a predetermined reference value.

10. The non-transitory storage medium recording an information processing program according to claim 1, wherein the information processing program further causes the information processing device to execute:
imaging for imaging a face of the person to be imaged if the at least one feature point contained in the face image of the person to be imaged as captured by the imaging device is positioned within a predetermined range having the target position as a reference point.

11. The non-transitory storage medium recording an information processing program according to claim 10,
wherein the target position corresponds to the at least one feature point of a face model that is held beforehand in a storage device, and
the information processing program further causes the information processing device to execute:
generating an object by pasting the face image of the person to be imaged that is captured in the imaging in such a manner that the at least one feature point in the face image corresponds to the at least one feature point in the face model.

12. The non-transitory storage medium recording an information processing program according to claim 1, wherein the information processing program further causes the information processing device to execute:
acquiring a sex determination result and an age determination result of the person to be imaged, and
in the displaying, at least one from among the sex determination result and the age determination result of the face image of the person to be imaged is further displayed.

13. An information processing method for causing an information processing device that acquires a face image of a person to be imaged that is captured by an imaging device, to execute:
determining whether a distance between a face of the person to be imaged and the imaging device is within a finite, non-zero predetermined range; and
if the distance between the face of the person to be imaged and the imaging device is determined to be within said predetermined range, displaying, on a display device, a target position for alignment of at least one feature point contained in the face image of the person to be imaged, together with the face image of the person to be imaged repeatedly captured by the imaging device, and if the distance between the face of the person to be imaged and the imaging device is determined to be outside said predetermined ranged, not displaying, on the display device, a target position for alignment of at least one feature point contained in the face image of the person to be imaged, together with the face image of the person to be imaged repeatedly captured by the imaging device.

14. An information processing system, comprising:
a display device; and
one or more computer processors configured to:
determine whether a distance between a face of a person to be imaged that is captured by an imaging device and the imaging device is within a finite, non-zero predetermined range; and
if the distance between the face of the person to be imaged and the imaging device is determined to be within said predetermined range display, on the display device, a target position for alignment of at least one feature point contained in the face image of the person to be imaged, together with the face image of the person to be imaged repeatedly captured by the imaging device, and if the distance between the face of the person to be imaged and the imaging device is determined to be outside said predetermined range, not display, on the display device, a target position for alignment of at least one feature point contained in the face image of the person to be imaged, together with the face image of the person to be imaged repeatedly captured by the imaging device.

15. An information processing device that acquires a face image of a person to be imaged that is captured by an imaging device, comprising:
a display device; and
one or more computer processors configured to:
determine whether a distance between a face of the person to be imaged and the imaging device is within a finite, non-zero predetermined range; and
if the distance between the face of the person to be imaged and the imaging device is determined to be within said predetermined range display, on the display device, a target position for alignment of at least one feature point contained in the face image of the person to be imaged, together with the face image of the person to be imaged repeatedly captured by the imaging device, and if the distance between the face of the person to be imaged and the imaging device is determined to be outside said predetermined range, not display, on the display device, a target position for alignment of at least one feature point cointained in the face image of the person to be imaged, together with the face image of the person to be imaged repeatedly captured by the imaging device.

16. A non-transitory storage medium recording an information processing program that is executed in an information processing device that acquires an image of an imaging target that is captured by an imaging device,
wherein the information processing program causes the information processing device to execute:
determining whether a distance between the imaging target and the imaging device is within a finite, non-zero predetermined range; and
if the distance between the imaging target and the imaging device is determined to be within said predetermined range, displaying, on a display device, a target position for alignment of at least one feature point contained in the image of the imaging target, together with the image of the imaging target repeatedly captured by the imaging device, and if the distance between the face of the person to be imaged and the imaging device is determined to be outside said predetermined range, not displaying, on the display device, a target position for alignment of at least one feature point contained in the face image of the person to be imaged, together with the face image of the person to be imaged repeatedly captured by the imaging device.

17. An information processing method for causing an information processing device that acquires an image of an imaging target that is captured by an imaging device, to execute:
determining whether a distance between the imaging target and the imaging device is within a finite, non-zero predetermined range; and
if the distance between the imaging target and the imaging device is determined to be within said predetermined range, displaying, on a display device, a target position for alignment of at least one feature point contained in the image of the imaging target, together with the image of the imaging target repeatedly captured by the imaging device, and if the distance between the face of the person to be imaged and the imaging device is determined to be outside said predetermined range, not displaying, on the display device, a target position for alignment of at least one feature point contained in the face image of the person to be imaged, together with the face image of the person to be imaged repeatedly captured by the imaging device.

18. An information processing system, comprising:

a display device; and one or more computer processors configured to:

determine whether a distance between an imaging target that is captured by an imaging device and the imaging device is within a finite, non-zero predetermined range; and if the distance between the imaging target and the imaging device is determined to be within said predetermined range display, on the display device, a target position for alignment of at least one feature point contained in the image of the imaging target, together with the image of the imaging target repeatedly captured by the imaging device, and if the distance between the face of the person to be imaged and the imaging device is determined to be outside said predetermined range, not display, on the display device, a target position for alignment of at least one feature point contained in the face image of the person to be imaged, together with the face image of the person to be imaged repeatedly captured by the imaging device.

19. An information processing device that acquires an image of an imaging target that is captured by an imaging device, comprising:

a display device; and one or more computer processors configured to:

determine whether a distance between the imaging target and the imaging device is within a finite, non-zero predetermined range; and if the distance between the imaging target and the imaging device is determined to be within said predetermined range display, on the display device, a target position for alignment of at least one feature point contained in the image of the imaging target, together with the image of the imaging target repeatedly captured by the imaging device, and if the distance between the face of the person to be imaged and the imaging device is determined to be outside said predetermined range, not display, on the display device, a target position for alignment of at least one feature point contained in the face image of the person to be imaged, together with the face image of the person to be imaged repeatedly captured by the imaging device.

* * * * *